United States Patent [19]

Tateno et al.

[11] Patent Number: 4,732,055
[45] Date of Patent: Mar. 22, 1988

[54] SHIFT CONTROL APPARATUS FOR AUTOMATIC TRANSMISSION SYSTEM

[75] Inventors: Toshiaki Tateno; Shigeki Fukushima, both of Yokohama; Tomoyuki Iwamoto, Kawasaki, all of Japan

[73] Assignee: Mitsubishi Jidosha Kogyo Kabushiki Kaisha, Tokyo, Japan

[21] Appl. No.: 923,831

[22] PCT Filed: Feb. 17, 1986

[86] PCT No.: PCT/JP86/00072
§ 371 Date: Dec. 2, 1986
§ 102(e) Date: Dec. 2, 1986

[87] PCT Pub. No.: WO86/04866
PCT Pub. Date: Aug. 28, 1986

[30] Foreign Application Priority Data

| Feb. 16, 1985 [JP] | Japan | 60-28748 |
| Feb. 16, 1985 [JP] | Japan | 60-28749 |
| Feb. 16, 1985 [JP] | Japan | 60-28750 |
| Mar. 26, 1985 [JP] | Japan | 60-59435 |
| Mar. 27, 1985 [JP] | Japan | 60-60809 |
| Mar. 27, 1985 [JP] | Japan | 60-60810 |
| Apr. 12, 1985 [JP] | Japan | 60-76639 |
| Jul. 19, 1985 [JP] | Japan | 60-159937 |

[51] Int. Cl.⁴ .......................................... B60K 41/18
[52] U.S. Cl. .................. 74/866; 364/424.1; 192/0.052; 192/0.09; 192/0.075
[58] Field of Search ............... 74/866; 364/424.1; 192/0.052, 0.075, 0.09

[56] References Cited

U.S. PATENT DOCUMENTS

| 3,756,358 | 9/1973 | Espenschied et al. | 192/0.09 |
| 4,194,608 | 3/1980 | Usui et al. | 192/0.075 X |
| 4,262,783 | 4/1981 | Scarrott et al. | 74/866 X |
| 4,529,072 | 7/1985 | Oguma et al. | 192/0.052 |
| 4,614,258 | 9/1986 | Fukunaga | 192/0.09 X |
| 4,618,043 | 10/1986 | Hattori et al. | 192/0.075 X |
| 4,629,045 | 12/1986 | Kasai et al. | 192/0.052 |
| 4,643,048 | 2/1987 | Hattori et al. | 192/0.09 X |
| 4,653,352 | 3/1987 | Nakao et al. | 74/866 |

FOREIGN PATENT DOCUMENTS 52-33225 3/1977 Japan.
60-215437 10/1985 Japan.

OTHER PUBLICATIONS

"Electronically Controlled Automated Five-Speed Transmission", Automotive Engineering, 3/84, pp. 77–79.

Primary Examiner—Dirk Wright
Attorney, Agent, or Firm—Abelman Frayne Rezac & Schwab

[57] ABSTRACT

A shift control for an automatic countershaft type transmission includes a memory device which stores a plurality of maps representing optimum speed ratios for various vehicle conditions. The control selects from the maps based on the speed of the vehicle, the position of the accelerator pedal and on the state of operation of a brake. The control further determines whether the position of a shift lever corresponds to the optimum gear ratio obtained from the selected map. The transmission is shifted to the optimum gear ratio when the shift lever doesn't correspond to the optimum gear ratio position.

16 Claims, 42 Drawing Figures

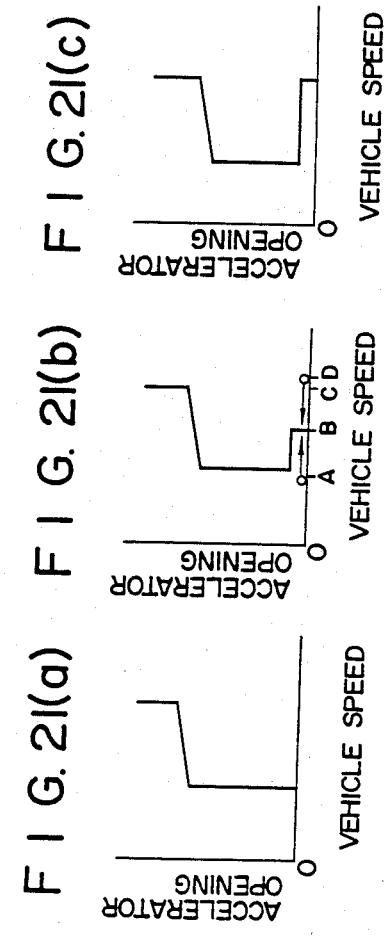

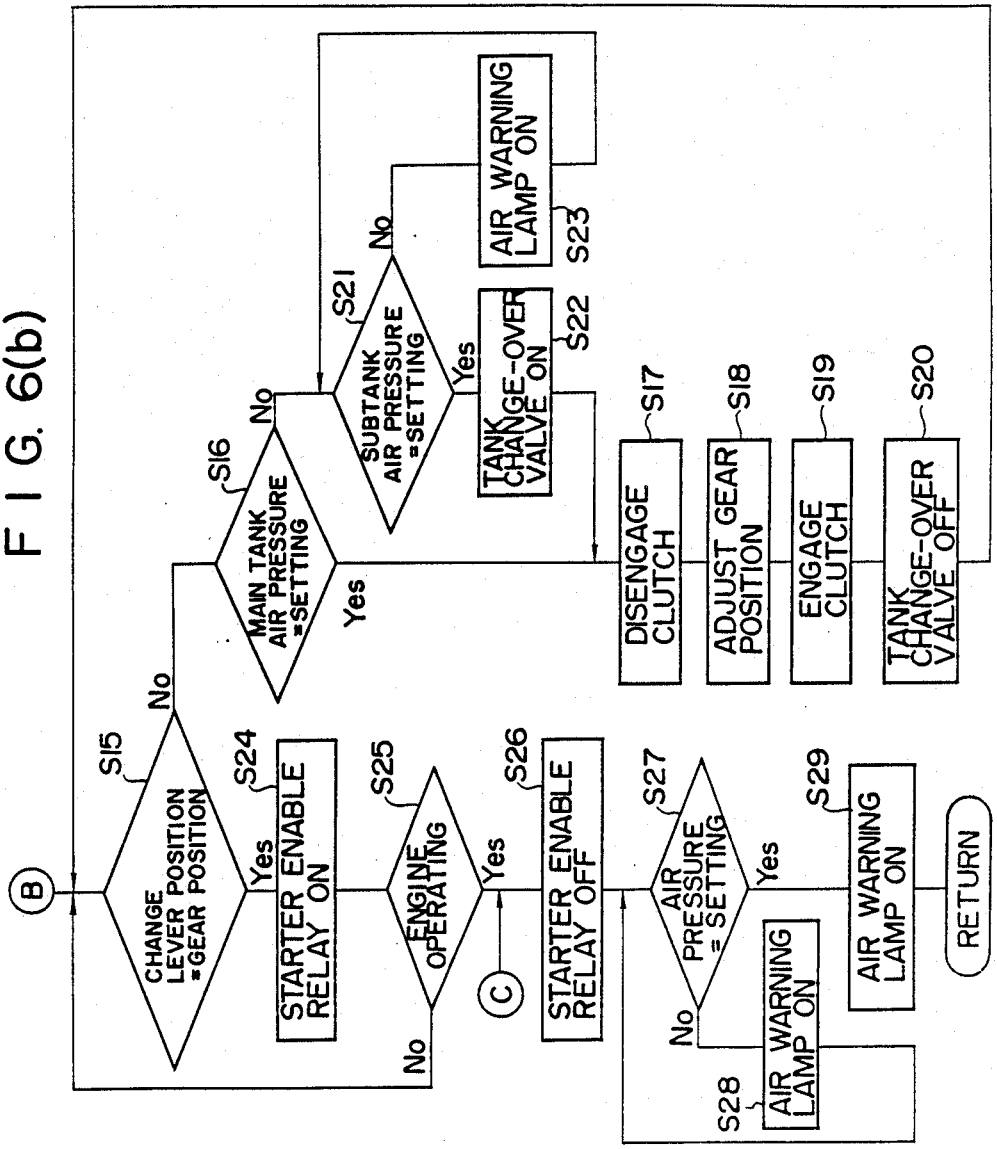

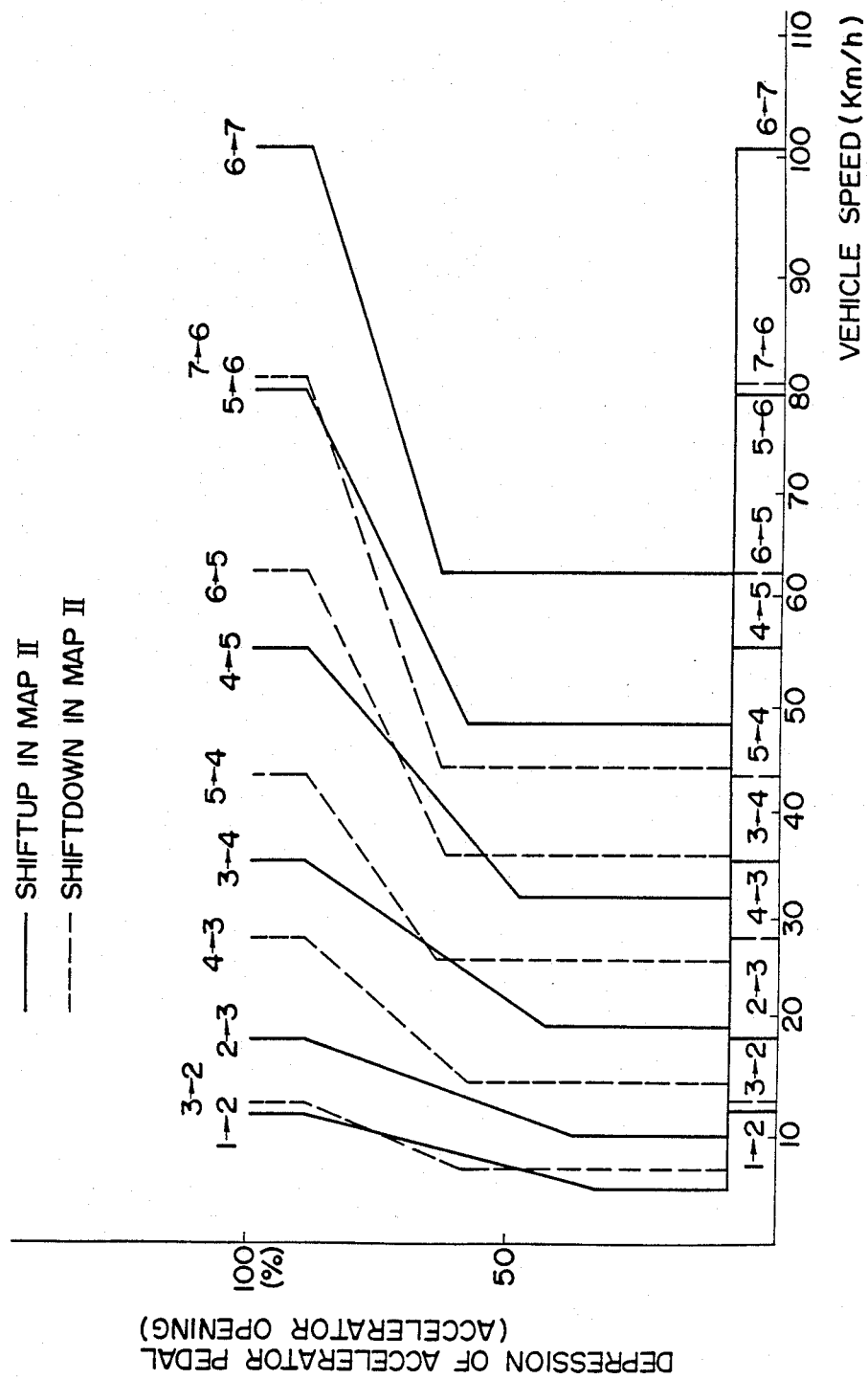

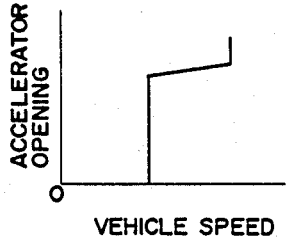
F I G. 19(a)
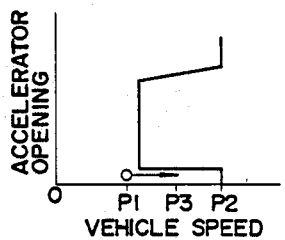
F I G. 19(b)
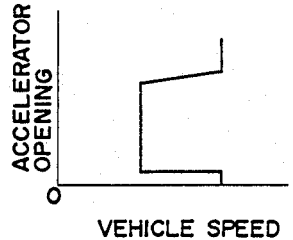
F I G. 19(c)
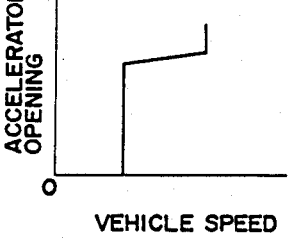
F I G. 19(d)
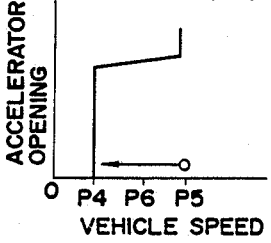
F I G. 19(e)
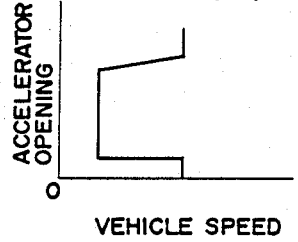
F I G. 19(f)
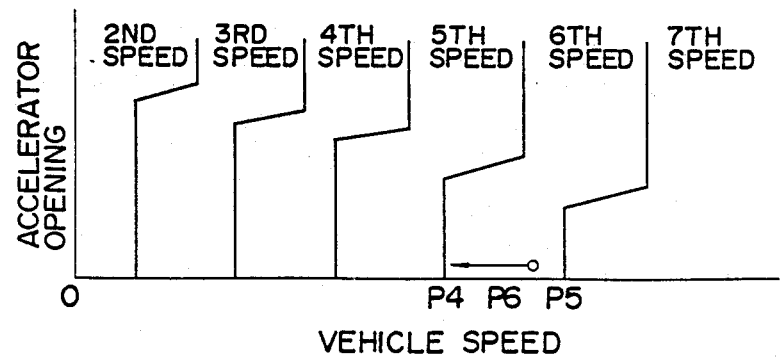
F I G. 20

F I G. 23
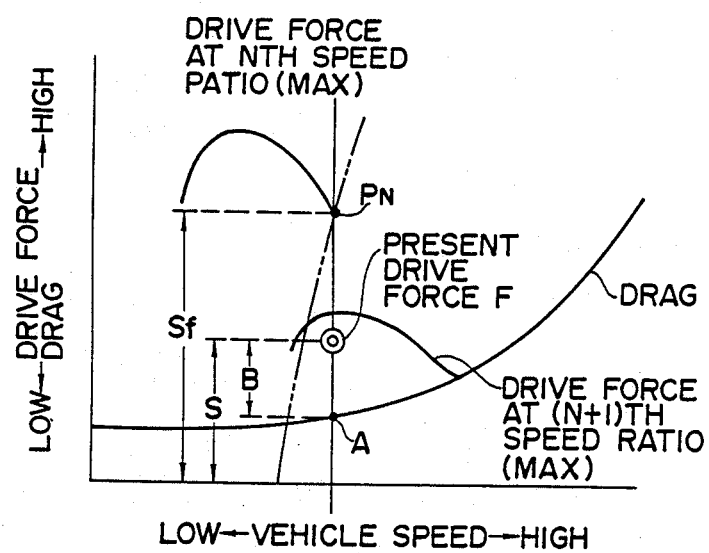

F I G. 25
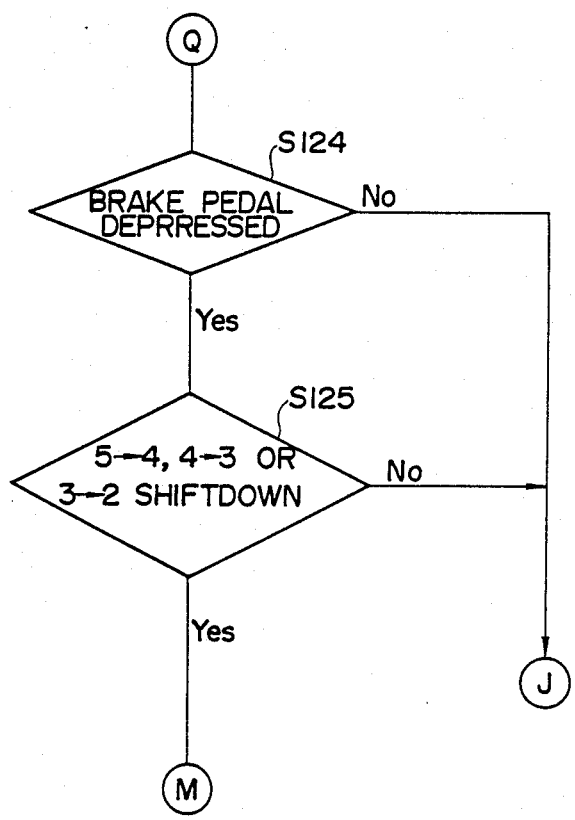

SHIFT CONTROL APPARATUS FOR AUTOMATIC TRANSMISSION SYSTEM

TECHNICAL FIELD

This invention relates to a shift control apparatus for an automatic transmission system of a type in which the stroke of a friction clutch interposed between an engine of a vehicle and a transmission is electronically controlled through an actuator, and the meshing position of the gears of the transmission is also electronically controlled through gear position change-over means.

BACKGROUND ART

For the purpose of alleviating the driver's effort to maneuver a large-sized truck, bus or the like, an automatic transmission system capable of automatically selecting the gear position depending on the running condition of the vehicle has been proposed.

Conventional automatic transmission systems are exclusively designed for use in small-sized passenger cars.

This automatic transmission system has generally such a structure that a fluid coupling such as a hydraulic torque converter is interposed between an engine and a planetary gear type transmission controlled by hydraulic pressure, and the gear position of the planetary gear type transmission is changed over by gear position change-over means.

An important matter to be taken into consideration for the development of an automatic transmission system suitable for application to a large-sized truck or the like is that the number of production of vehicles of this kind is very small as compared to that of passenger cars. Therefore, newly designing an expensive torque converter or the like is quite disadvantageous from the aspect of cost, and it is desirable that the existing drive system including the friction clutch and transmission as well as the existing production equipment, can be directly utilized for the production without any alteration.

DISCLOSURE OF INVENTION

It is a primary object of the present invention to provide a shift control apparatus for an automatic transmission system, which can automatically achieve a smooth speed shift under electronic control in spite of the fact that the existing drive system is directly used without any alteration.

In accordance with the present invention, there is provided a shift control apparatus for an automatic transmission system comprising a clutch coupled to an output shaft of an engine; a parallel-shaft type gear transmission coupled at its input shaft to the clutch; a clutch actuator actuating engagement and disengagement of the clutch; actuator control means for controlling the operation of the actuator; clutch position detecting means for detecting engagement and disengagement of the clutch; shift position detecting means for generating a signal indicating of the shift position of the parallel-shaft type gear transmission; shift position change-over means for changing the meshing state of the parallel-shaft type gear transmission; operating condition detecting means for detecting the operating condition of the vehicle; and automatic shift control means including map selecting means for selecting a map from among a plurality of maps representing optimum speed ratios determined on the basis of signals applied from the operating condition detecting means and indicative of at least the speed of the vehicle and the position of an accelerator pedal, the map being selected depending on whether a brake device is operated or not, optimum speed ratio determining means for determining an optimum speed ratio on the basis of the map selected by the map selecting means and according to the signals indicative of at least the vehicle speed and accelerator position applied from the operating condition detecting means, coincidence judging means for judging as to whether or not the shift position detected by the shift position detecting means coincides with the optimum speed ratio determined by the optimum speed ratio determining means, and shift position selecting means for applying a shift signal to the shift position change-over means so as to shift the parallel-shaft type gear transmission to the optimum shift position when non-coincidence is judged by the coincidence judging means.

The clutch is operated through the clutch actuator controlled by the actuator control means, thereby permitting an interrupting transmission of drive force from the engine to the parallel-shaft type gear transmission. The actuator control means controls the operating characteristic of the clutch actuator to transmit the drive force with least shift shock. The shift position change-over means is operated by the automatic shift control means in interlocking relation with the operation of the clutch, so that the optimum gear position can be automatically selected. This shift operation is carried out on the basis of the will of the driver and a predetermined running condition of the vehicle.

On the other hand, when the vehicle runs on, for example, a descent while an exhaust brake device is in operation and the accelerator pedal is not depressed by the driver, the vehicle speed to be changed over to a gear position of a higher speed ratio is set at a higher speed is spite of an increase in the vehicle speed. Therefore, the gear position is maintained at a lower speed ratio thereby further enhancing the effect of exhaust braking as well as the effect of engine braking.

BRIEF DESCRIPTION OF DRAWINGS

FIGS. 1 to 16 relate to a first embodiment of the present invention, in FIG. 1 shows schematically the structure of an automatic transmission system controlled by the first embodiment of the present invention; FIG. 2 is a conceptual diagram showing an example of a shift pattern of the automatic transmission system; FIG. 3 is a graph showing an example of speed shift characteristics in a $D_P$ range and a $D_E$ range of the automatic transmission system; FIG. 4 is a graph showing an example of a map for determining the duty ratio; FIG. 9 is a graph showing an example of time-related changes of the engine rotation speed and clutch rotation speed during a speed shift; FIG. 10 is a graph showing a region of the change rate of the engine rotation speed during the speed shift; FIG. 11 is a conceptual diagram of shift operation during a shiftdown; FIG. 12 is a conceptual diagram of shift operation during a shiftup; FIGS. 13 and 15 are graphs showing an example of speed shift characteristics of map I in the $D_P$ range and $D_E$ range respectively; and FIGS. 14 and 16 are graphs showing an example of speed shift characteristics of map III during shiftups $D_P$ range and $D_E$ range respectively.

FIG. 18 is a graph showing speed shift characteristics of map I in the $D_P$ range and $D_E$ range.

FIGS. 19(a), 19(b), 19(c), 19(d), 19(e), 19(f), - - -, FIGS. 21(a), 21(b), 21(c) relate to a third embodiment of the present invention, in which FIGS. 9(a) to 9(f) are graphs showing comparison of shiftup and shiftdown patterns between various speed ratios; FIG. 20 is a graph showing an example of a speed ratio selecting map (used only when the exhaust brake device is operated during a shiftdown) based on the pattern shown in FIG. 19(e); and FIGS. 21(a) to 21(c) are graphs showing prior art shift patterns illustrated for comparison purpose. FIGS. 22(a), 22(b) and FIG. 23 relate to a fourth embodiment of the present invention, in which FIGS. 22(a) and 22(b) are a flow chart showing an example of a control program; and FIG. 23 is a graph showing the relation between the vehicle speed and the drag as well as the drive force.

FIG. 25 is a flow chart showing an example of a control program in a sixth embodiment of the present invention.

BEST MODE FOR CARRYING OUT THE INVENTION

Figure 1:
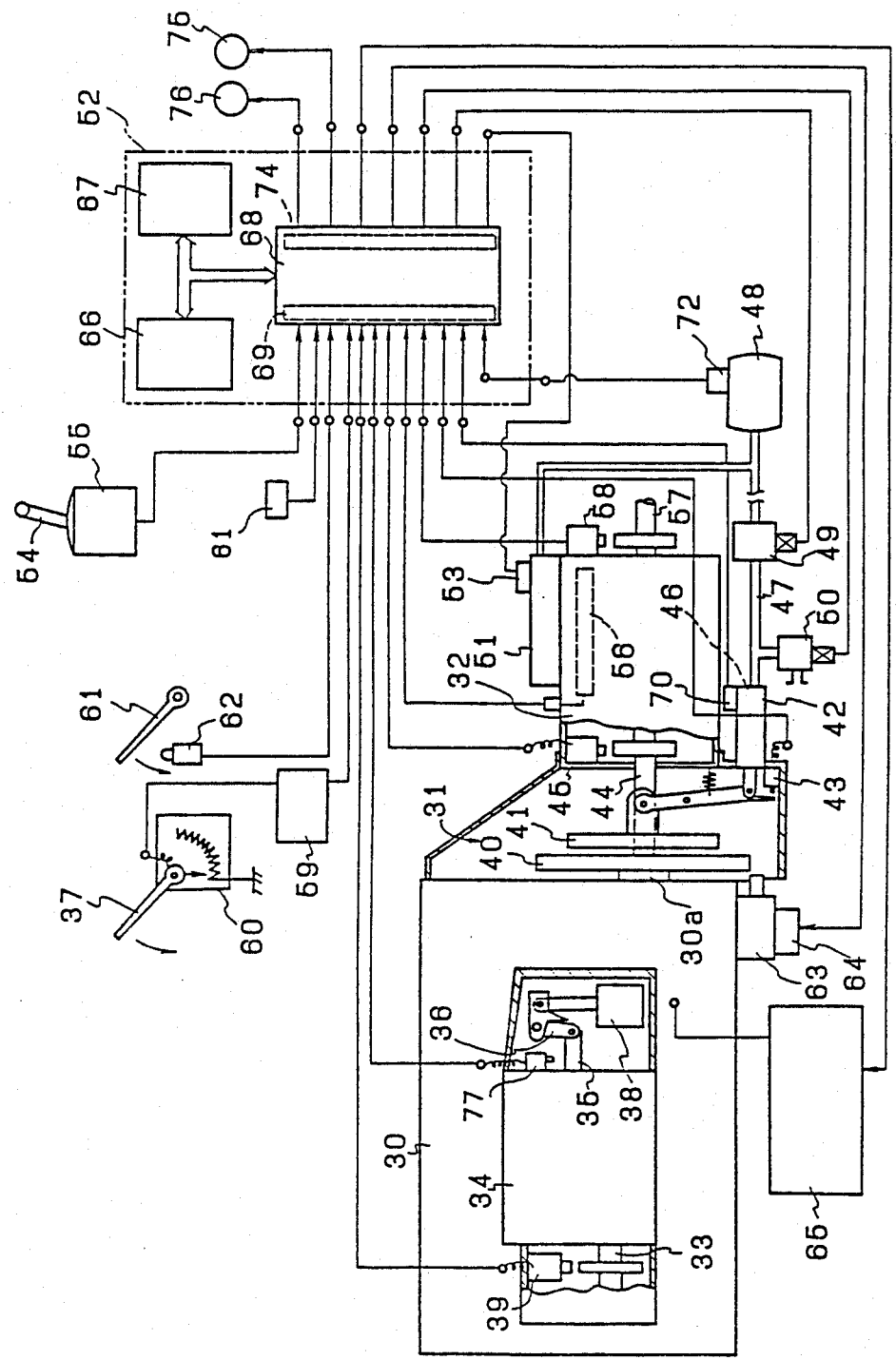
Figure 2:
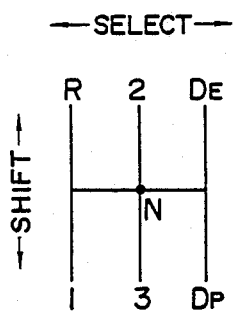
Figure 3:
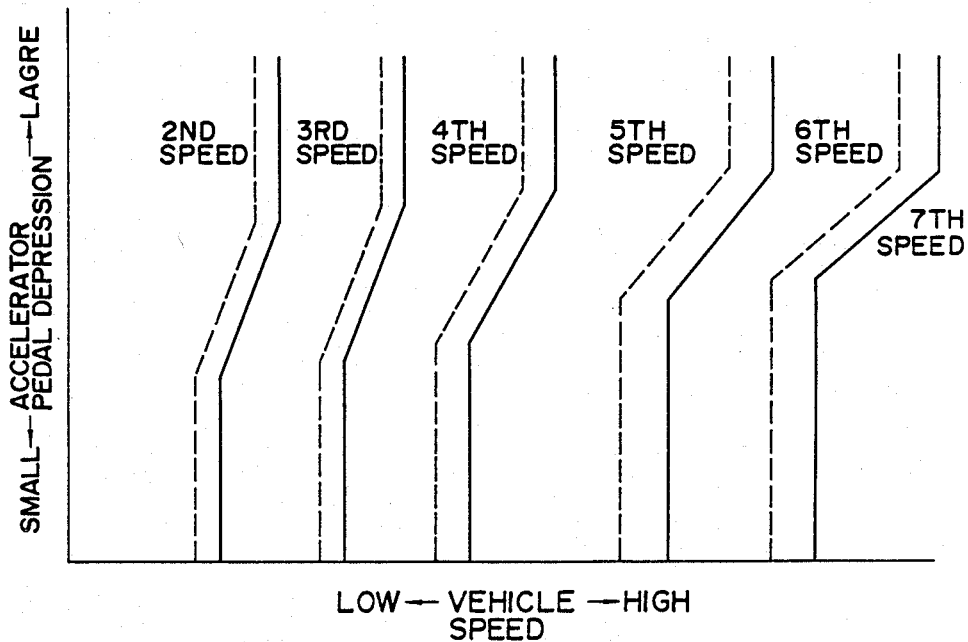

As shown in FIG. 1 illustrating the concept of a first embodiment of the shift control apparatus realizing the present invention, an automatic transmission system is mounted to cover a Diesel engine (referred to hereinafter simply as an engine) and a gear transmission 32 which receives the rotating force of an engine output shaft 30a through a friction clutch (referred to hereinafter simply as a clutch) 31. Mounted to the engine 30 is a fuel injection pump (referred to hereinafter simply as an injection pump) 34 which includes an input shaft 33 rotating at a rotation speed is ½ of that of the engine output shaft 30a. An electromagnetic actuator 38 is connected through a link 36 to a control rack 35 of the pump 34, and an engine rotation sensor 39 generating an pm signal of the output shaft 30a of the engine 30 is associated with the input shaft 33. A clutch disc 41 of the clutch 31 is brought into pressure engagement with a flywheel 40 by well-known pressing means (not shown). When an air cylinder 42 acting as a clutch actuator is placed in its operating state from a non-operating state, the pressing means is urged in the releasing direction, and the clutch 31 changes from the engaged state to its disengaged state. (FIG. 1 shows the clutch 31 in its disengaged state.) The clutch 31 is provided with a clutch stroke sensor 70 sensing the disengaged state or engaged state of the clutch 31 on the basis of the clutch stroke. However, in lieu of the clutch stroke sensor 70, a clutch touch sensor 43 may be provided. An input shaft 44 of the gear transmission 32 is associated with a clutch rpm sensor 45 generating a signal indicative of the rpm (referred to hereinafter as a clutch rotation speed) of the input shaft 44. An air passage 47 connected to an air chamber 46 of the air cylinder 42 is connected to an air tank 48 which is a source of high pressure air. An electromagnetic type cut valve 49 acting as on-off means for controlling the supply of actuating air is disposed midway of the air passage 47, and, further, a normally-open type electromagnetic valve 50 duty-controlled to permit communication of the air chamber 46 with the atmosphere is also connected to the air passage 47. The air cylinder 42 is provided with the aforementioned clutch stroke sensor 70 generating the clutch stroke signal, and the air tank 48 is provided with an air sensor 72 generating an ON signal when the internal air pressure drops to less than a predetermined value. In order to change over the gear position of the gear transmission 32 which establishes various speed ratios, the driver manipulates a change lever 54 to bring it to a corresponding shift position in a shift pattern as, for example, shown in FIG. 2, thereby changing over a speed ratio selection switch 55. On the basis of a shift signal generated as a result of changeover of the speed ratio selection switch 55, a gear shift unit 51 acting as gear position change-over means is actuated, so that the gear position can be changed over to the desired speed ratio corresponding to that selected on the shift pattern. In FIG. 2, R indicates a reverse range: N indicates a neutral range; 1, 2, 3 indicate ranges of specified speed shifts respectively; and $D_P$, $D_E$ indicate ranges of automatic speed shifts between a 2nd speed and a 7th speed. When the $D_P$ range or $D_E$ range is selected, one of the 2nd speed to the 7th speed is automatically determined on the basis of the running condition of the vehicle by running an optimum speed-ratio determining routine described later. FIG. 3 shows modes of speed shifts in the $D_P$ range of powerful automatic speed shifts and in the $D_E$ range of economy automatic speed shifts. As shown in FIG. 3, the timing of speed shifts between the 2nd speed and the 7th speed is indicated by the dotted lines in the case of the $D_E$ range and by the solid lines in the case of the $D_P$ range, and the speed shifts in the $D_P$ range are set on a higher speed side relative to the $D_E$ range so as to deal with a heavy loaded condition or the like of the vehicle. The gear shift unit 51 is provided with a plurality of electromagnetic values 53 (only one of which is shown in FIG. 1) energized by energizing signals applied from a control unit 52, and a pair of power cylinders (not shown) supplied with high-pressure actuating air from the air tank 48 through the electromagnetic valves 53 to actuate a select fork and a shift fork of the gear transmission 32. The respective power cylinders are actuated by the energizing signals applied to the electromagnetic valves 53, thereby actuating the select and shift forks in order and changing the meshing mode of the gears of the gear transmission 32. Further, the gear shift unit 51 is associated with gear position switches 56 acting as gear position sensors sensing individual gear positions. Gear position signals from these gear position switches 56 are applied to the control unit 52. Further, an output shaft 57 of the gear transmission 32 is associated with a vehicle speed sensor 58 generating a vehicle speed signal. Further, an accelerator pedal 37 is associated with an accelerator load sensor 60 which converts a resistance change corresponding to the amount of depression of the accelerator pedal 37 into a voltage value, and this voltage value is then converted into a digital signal by an A/D converter 59. A brake sensor 62 generates a brake signal of high level in response to the depression of a brake pedal 61. 61' designates an exhaust brake switch which is turned on when an exhaust brake device is placed in operation. The engine 30 is provided with a starter 63 which meshes suitable with a ring gear formed on the outer periphery of the flywheel 40 to start the engine 30. A starter relay 64 is connected to the control unit 52. The reference numeral 65 in FIG. 1 designates a microcomputer mounted in the vehicle independently of the control unit 52 so as to carry out various controls of the vehicle. The microcomputer 65 executes the drive control, etc. of the engine 30 in response to input signals from various sensors (not shown). This microcomputer 65 applies an energizing signal to the electromagnetic actuator 38 for the injection pump 34 so as to increase or decrease fuel, thereby controlling the increase or decrease in the rpm (referred to hereinafter as an engine rotation speed) of the output shaft 30a of the engine 30.

The control unit 52 is a microcomputer provided exclusively for the automatic transmission system and includes a microprocessor or (referred to hereinafter as a CPU) 66, a memory 67 and an interface 68 which is an input signal processing circuit. Applied to input ports 69 of the signals from the speed ratio selection switch 55, brake sensor 62, accelerator load sensor 60, engine rotation sensor 39, clutch rotation speed sensor 45, gear position switches 56, vehicle speed sensor 58, clutch touch sensor 43 (used when detecting the disengaged or engaged state of the clutch 31 in lieu of the clutch stroke sensor 70), clutch stroke sensor 70 and air sensor 72. On the other hand, output parts 74 are connected to the microcomputer 65, starter relay 64, electromagnetic valves 50, 53 and cut value 49 to apply output signals to them respectively. The reference numeral 75 in FIG. 1 designates an air warning lamp energized by an output from a drive circuit (not shown) when the internal air pressiure of the air tank 48 does not attain the predetermined setting. The reference numeral 76 designates a clutch warning lamp energized by an output when the amount of wear of the clutch 31 exceeds a predetermined value.

Figure 4:
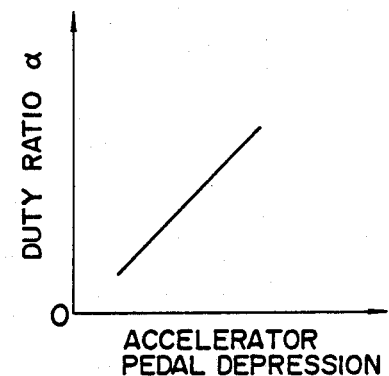

The memory 67 includes a read-only ROM written with a program and data shown in a flow chart of FIGS. 5 to 8, and a write/read RAM. More precisely, besides the program described above, a map of the duty ratio of the electromagnetic value 50 relative to the value of the accelerator load signal, as shown in FIG. 4, is stored previously in the ROM, and, by suitably referring to this map, the corresponding value is read out. The aforementioned speed ratio selection switch 55 generates a select signal and a shift signal as a speed shift signal. The speed ratios corresponding to all the combinations of the pair of these two signals are previously stored in the form of a data map, and, in response to the application of a select signal and a shift signal, this map is referred to apply the corresponding output signals to the individual electromagnetic valves 53 of the gear shift unit 51, so as to shift the gear position to the desired speed ratio corresponding to the speed shift signal. In this case, upon completion of the desired speed shift, the gear position signals are generated from the gear position switches 56. Judgment is made as to whether or not all the gear position signals corresponding to the select signal and shift signal are generated, and, on the basis of the result of judgment, a signal indicative of whether the meshing of the gears is normal or abnormal is generated. Further, the ROM stores a map for determining an optimum speed ratio on the basis of the vehicle speed signal, accelerator load signal and engine rotation signal when the desired speed ratio is present in the $D_P$ range of $D_E$ range.

The sequence of shift control in the present embodiment will be described with reference to FIGS. 5 to 8. In FIGS. 5 to 8, the symbol S designates a control step.

Figure 5A:
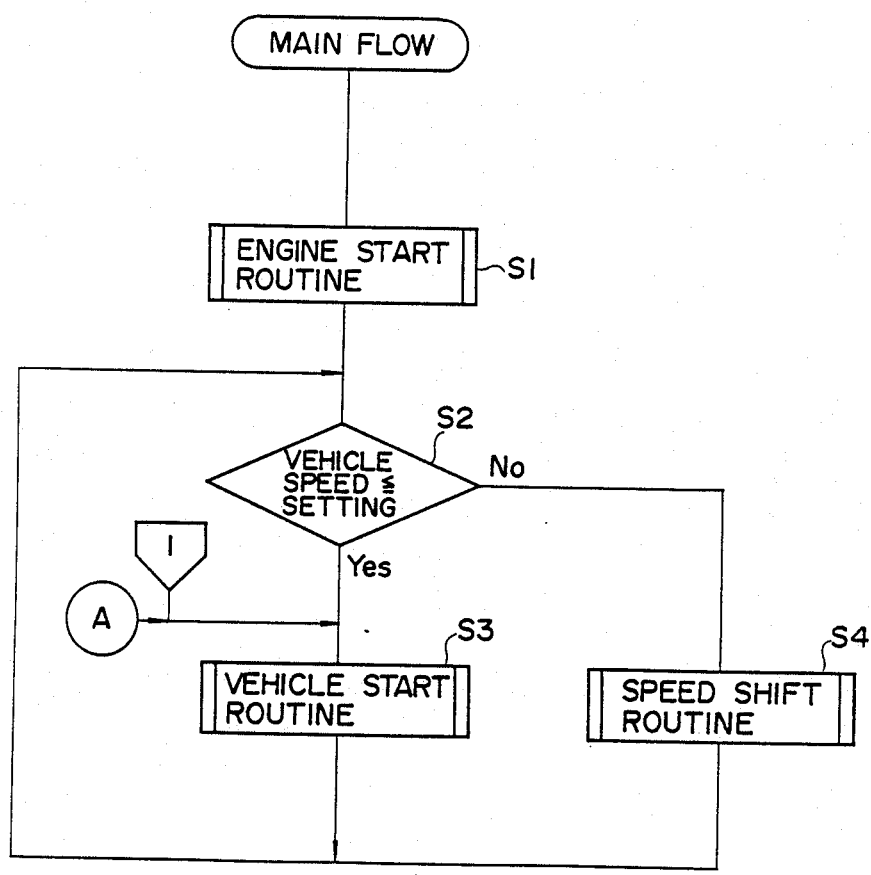
FIGS. 5(a), 5(b), - - -.
Figure 5B:
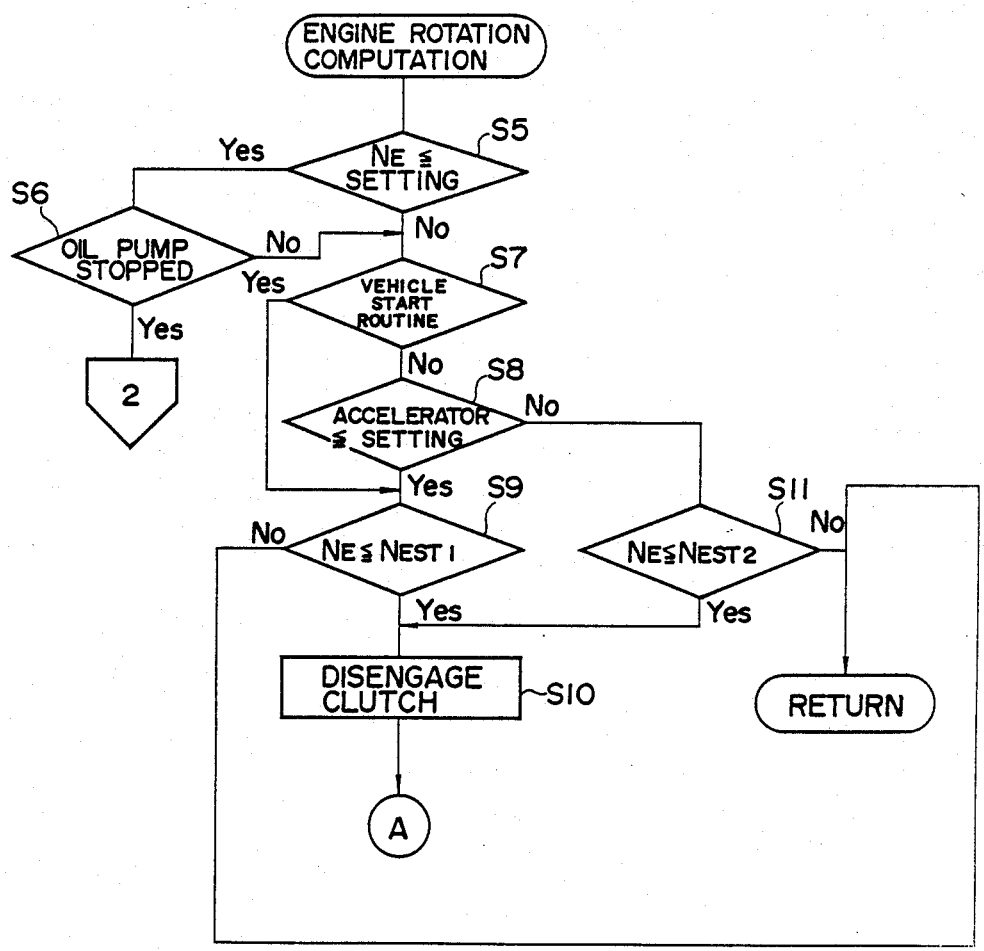

As shown in FIGS. 5(a) and 5(b), when the program starts, the control unit 52 executes an engine starting routine (step 1). After the engine starting routine is run, the vehicle speed signal is applied to the control unit 52. The control unit 52 executes a vehicle starting routine (step 3) when the value of the vehicle speed signal is detected to be smaller than a predetermined value (for example, 0 Km/h to 3 Km/h) in step 2. On the other hand, the control unit 52 executes a speed shift routine when the vehicle speed value is larger than the predetermined value (step 4). However, when the engine rotation speed $N_E$ is computed, and the engine rotation speed $N_E$ detected before the execution of the vehicle starting routine is judged to be lower than a predetermined setting (for example, the idling rotation speed) in step 5, the control unit 52 judges as to whether or not the oil pump is stopped (step 6), and, when the oil pump is not in operation, regards that the engine is not in operation and executes the engine starting routine again.

When the result of judgment proves that the oil pump is not stopped or that the engine rotation speed $N_E$ exceeds the predetermined setting, the control unit 52 judges in step 7 as to whether or not the vehicle starting routine is being executed. When the result of judgment proves that the vehicle starting routine is not being executed, the control unit 52 compares the amount of depression of the accelerator pedal 37 (referred to hereinafter as an accelerator load signal) with a predetermined value to judge as to whether or not the driver has the will of starting the vehicle (step 8). When the result of judgment proves that the vehicle starting routine is being run and that the accelerator load signal exceeds the predetermined value, the control unit 52 compares the engine rotation speed $N_E$ with a first engine-stalling preventive rotation speed $N_{EST1}$ (step 9) and acts to disengage the clutch 31 to run the vehicle starting routine again when the result of comparison proves that the engine rotation speed $N_E$ is lower than the first engine-stalling preventive rotation speed $N_{EST1}$. (step 10). On the other hand, when the accelerator load signal is smaller than the predetermined value, the control unit 52 compares the engine rotation speed $N_E$ with a second engine-stalling preventive rotation speed $N_{EST1}$ higher than the first engine-stalling preventive rotation speed $N_{EST1}$ (step 11) and acts to disengage the clutch 31 to run the vehicle starting routine again when the result of comparison proves that the engine rotation speed $N_E$ is lower than the second engine-stalling preventive rotation speed $N_{EST2}$. The program returns to the usual processing when the result of judgment proves that the engine rotation speed $N_E$ exceeds the second engine-stalling preventive rotation speed $N_{EST2}$ or that the engine rotation speed $N_E$ exceeds the first engine-stalling preventive rotation speed $N_{EST1}$.

Figure 6A:
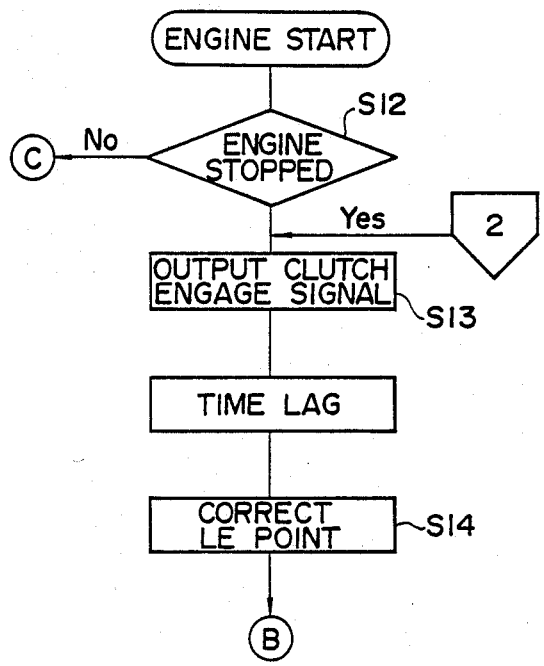

In the engine starting routine shown in FIGS. 6(a) and 6(b), the control unit 52 judges in step 12 as to whether or not the value of the signal indicative of the engine rotation speed $N_E$ lies within a stop range of the engine 30, and, when the result of judgment proves that the engine 30 is not in operation, generates a clutch engaging signal (step 13). After a time lag, the clutch 31 is engaged under the normal pressure and normal condition. After the clutch 31 is engaged under the normal pressure and normal condition, a semiengaged clutch position (referred to hereinafter as an LE point), where the clutch 31 is disengaged to a certain extent from the normal engaged position, and transmition from the rotating state to the stopped state occurs on the wheels of the vehicle, is corrected depending on the amount of wear of the facing of the clutch 31 and the presence or absence of a vehicle load (step 14). By so correcting, the stroke of the clutch disc 41, required until the clutch 31 is completely engaged from the LE point, is maintained substantially constant, and the clutch 31 can be smoothly engaged regardless of the state of the vehicle. After the correction of the LE point, judgment is made as to whether or not the position of the change lever 54 coincides with the gear position. That is, judgment is made as to whether or not the speed shift signal coincides with the gear position signal, and the gears of the gear transmission 32 are arranged to provide the desired speed ratio (which is previously set at, for example, the second speed when the $D_E$ range or $D_p$ range is selected) specified by the speed ratio selection switch 55. When the gear position differs from the position of the change lever 54, judgment is made as to whether or not the pressure of air in the air tank 48, which is the main tank, builds up to the predetermined value (step 16). When the result of judgment proves that the air pressure is equal to the predetermined value, the clutch 31 is disengaged (step 17), and the actuator (not shown) is operated by the internal air of the air tank 48 to cause automatic coincidence of the gear position with the position of the change lever 54 (step 18). After engaging the clutch 31 again (step 19) and turning off an electromagnetic valve provided for changing over between the main tank or the air tank 48 and a sub-tank (not shown) (step 20), judgment made again as to whether or not the gear position coincides with the position of the change lever 54. On the other hand, when the pressure of air in the air tank 48 is lower than the predetermined level, judgment is made as to whether or not the pressure of air in the sub-tank builds up to the predetermined level (step 21). When the result of judgment proves that the predetermined pressure is built up, the change-over-purpose electromagnetic valve is turned on (step 22), and the clutch 31 is disengaged. The power cylinders are actuated by the internal air of the sub-tank to automatically select the gear position corresponding to the position of the change lever 54. When the pressure of air in the sub-tank is not built up to the predetermined level, the air warning lamp 75 is energized in step 23 to inform the driver of the fact that the pressure of air in the air tank 48 and sub-tank is lower than the predetermined level. On the other hand, when the result of judgment proves that the gear position coincides with the position of the change lever 54, a starter enable relay is turned on (step 24). When the starter enable relay is turned on, the starter 63 can start the operation of the engine 30. Judgment is made as to whether or not the engine 30 has been started (step 25). When the result of judgment proves that the engine 30 has been started, the starter enable relay is turned off (step 26), while, when the result of judgment proves that the engine 30 has not been started, judgment is made again in step 15 as to whether or not the gear position coincides with the position of the change lever 54. After turning off the starter enable relay, whether or not the pressure of air in the main tank 48 and sub-tank has built up to the predetermined level is checked (step 27). When the result of checking proves that the predetermined pressure has not been built up, the air warning lamp 75 is energized (step 28), and judgment is repeated until the pressure of air builds up to the predetermined level. When the result of checking proves that the predetermined pressure has built up, the air warning lamp 75 is deenergized to complete the engine starting routine (step 29).

Figure 7A:
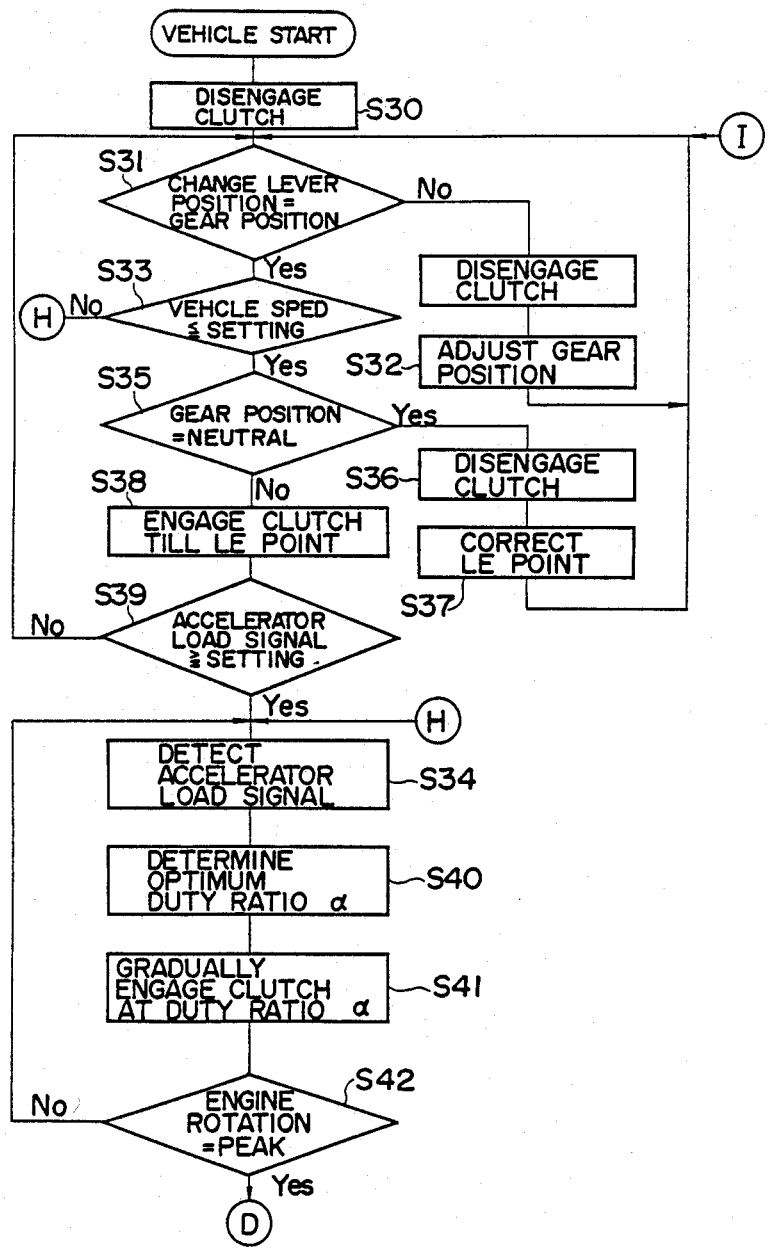
Figure 7B:
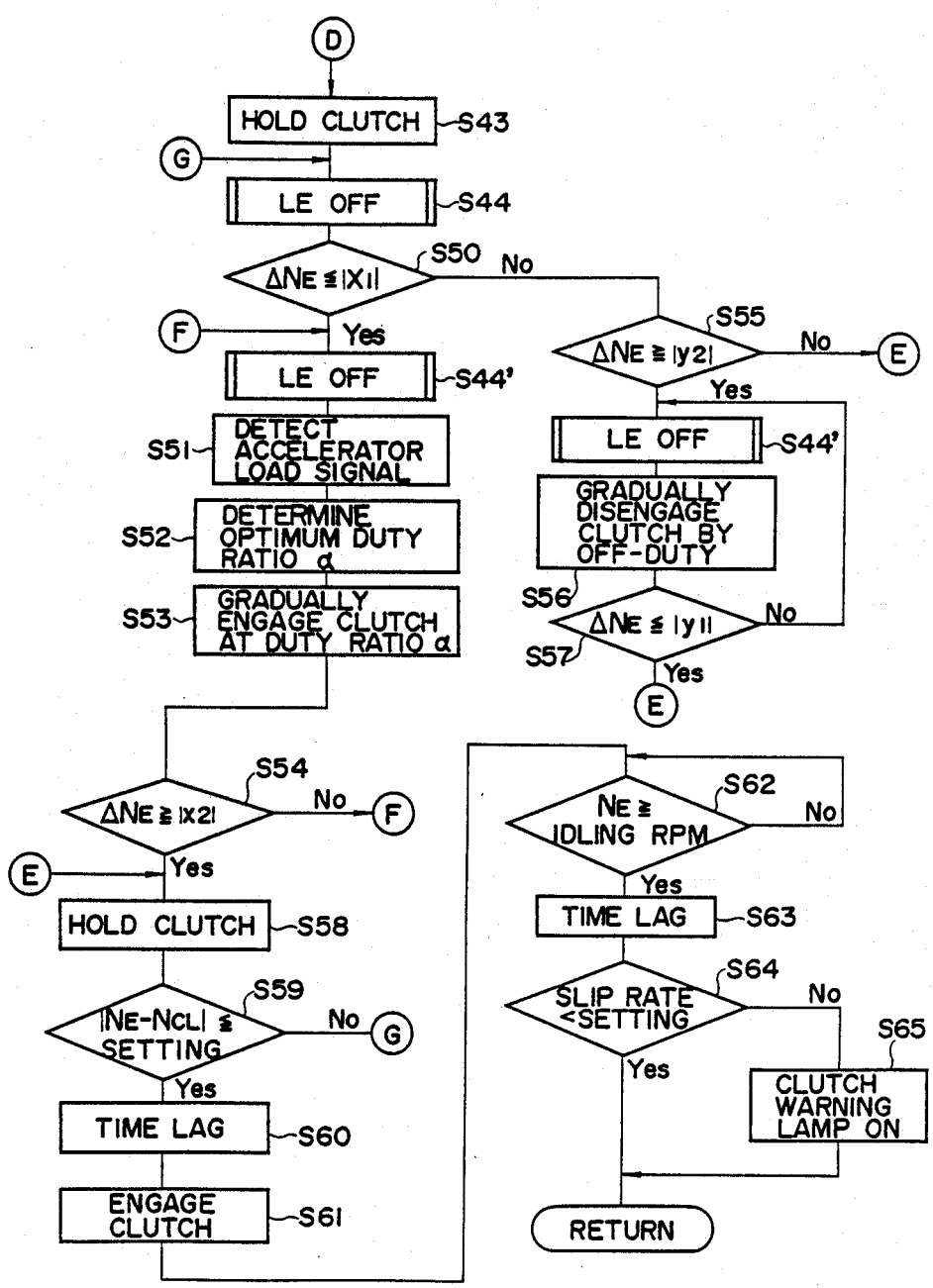
Figure 7C:
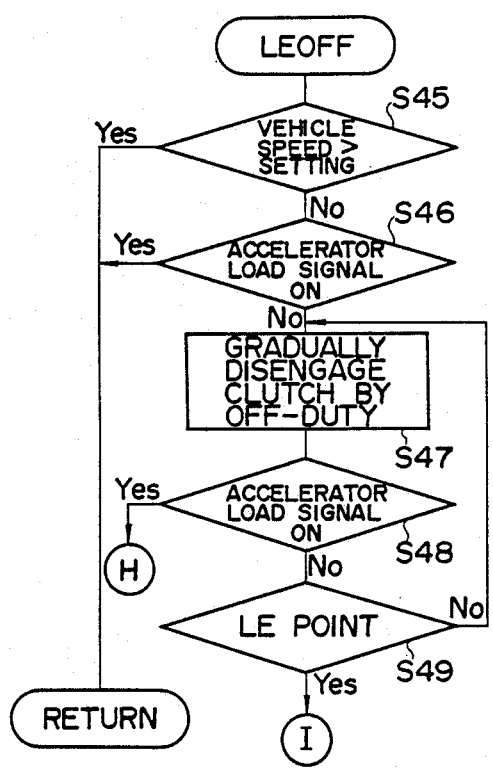
Figure 9:
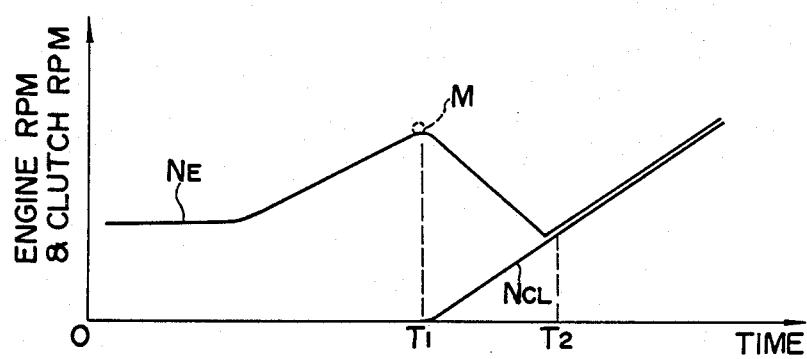

After completion of the engine starting routine, the vehicle speed signal is read, and, when the vehicle speed is lower than the predetermined setting, the vehicle starting routine is started. As shown in FIGS. 7(a), 7(b) and 7(c), CPU 66 applies an ON signal to the cut valve 49 to disengage the clutch 31. (step 30). Then, judgment is made as to whether or not the gear position coincides with the position of the change lever 54 (step 31), and, when the result of judgment is NO, the gear position is set at the desired speed ratio (step 32). When the gear position coincides with the position of the change lever 54, judgment is made again as to whether or not the vehicle speed is lower than the predetermined setting (step 33). When the result of judgment is NO because the vehicle speed is higher than the predetermined setting, the program proceeds to step 34 where the accelerator load signal is detected as described later. On the other hand, when the result of judgment is YES, judgment is in step 35 as to whether or not the gear position attaining the desired speed ratio is neutral on the basis of the speed shift signal. When the result of judgment is YES, the LE point is corrected again in step 37 after execution of step 36. On the other hand, when the result of judgment is NO because the gear position is not neutral, the clutch 31 is engaged until the LE point is reached (step 38). Then, judgment is made as to whether or not the level of the accelerator load signal is higher than a predetermined level (a voltage as low as that merely indicative of the will of the driver to start the vehicle) (step 39). When the result of judgment is NO because the driver has no will of starting the vehicle, the aforementioned steps are repeated. On the other hand, when the result of judgment is YES because the driver has the will of starting the vehicle, step 39 is followed by step 34 where the accelerator load signal is detected. Then, the optimum duty ratio $\alpha$ corresponding to the detected value of the accelerator load signal is read from the map of FIG. 4 (step 40). A pulse signal representing read-out optimum duty ratio $\alpha$ is applied to the electromagnetic valve 50 to engage the clutch 31 gradually (step 41). At this time, the CPU 66 applies a select signal to the input port 69 so that the signal indicative of the engine rotation speed $N_E$ can be continuously applied, and the time-serial data of the engine rotation speed $N_E$ based on the signal indicative of the engine rotation speed N are sequentially stored in the RAM of the memory 67. The data are computed until the peak point M of the engine rotation speed $N_E$ shown in FIG. 9 illustrating an example of changes in the engine rotation speed $N_E$ and clutch rotation speed $N_E$, is detected. Until this speak point M is detected, the result of judgment is NO, and the steps are repeated form the accelerator load signal detecting step 34. On the other hand, when the peak point M is detected at time $T_1$ step 42, the electromagnetic valve 50 is held in its on state from this time $T_1$ (step 43). The peak point M appears due to the fact that the rotation of the output shaft 30a of the engine 30 causing the rotation of the input shaft 44 of the gear transmission 32 through the clutch 31 decreases as the drive power starts to be transmitted to the driving wheels.

Then, an LEOFF routine S44 is executed. This LEOFF routine S44 deals with the case where the vehicle is driven quite slowly with the clutch 31 being maintained in its semi-engaged state, unlike normal starting. As shown in FIG. 7(c), according to this LEOFF routine S44, judgment is first made as to whether or not the vehicle speed is higher that a predetermined setting in step 45. When the result of judgment is YES because the vehicle speed is higher than the predetermined setting, the vehicle is judged to be normally started. The LEOFF routine is ended, and the program returns to the vehicle starting flow. On the other hand, when the result of judgment is NO, judgment is then made as to whether or not the accelerator pedal 37 is depressed (step 46). When the result of judgment is YES, the LEOFF routine is similarly ended. On the other hand, when the result of judgment is NO, the friction clutch 31 is gradually disengaged by application of an off-duty signal until the LE point is reached (step 47). In the meantime, judgment is made as to whether or not the accelerator pedal 37 is depressed (step 48). When the result of judgment proves that the accelerator pedal 37 is depressed, the program returns to the aforementioned step of accelerator load signal detection. Further, when the clutch 31 is judged to be retracted to the LE point in step 49, the program returns to the aforementioned step of judging coincidence between the position of the change lever 54 and the gear positon.

Figure 10:
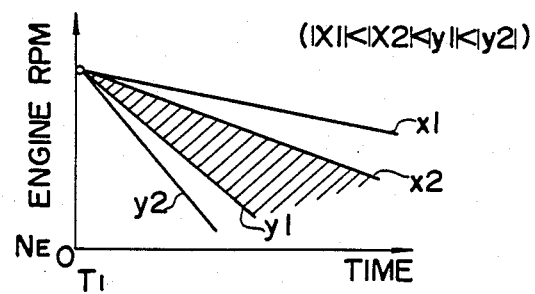

When the LEOFF routine is ended and the vehicle is judged to be normally started, the clutch 31 is engaged to the clutch-meet state from the semi-engaged state corresponding to the LE point. Since, at this time, the engine rotation speed $N_E$ has passed the peak point M and decreases gradually with the increase in the clutch rotation speed $N_{CL}$ corresponding to the rotation speed of the input shaft 44 of the gear transmission 32, the engine rotation speed $N_E$ is so controlled that the falling rate of the engine rotation speed $N_E$ lies within a predetermined range thereby lessening the starting shock. More precisely, judgment is first made as to whether or not the engine rotation falling rate $\Delta N_E$ per predetermined time is less than a first setting $|x_1|$ shown in FIG. 10 (step 50). When the result of judgment is YES, the accelerator load signal is detected again (step 51) after execution of the aforementioned LEOFF routine S44', and the optimum duty ratio corresponding to the detected value is determined (step 52). The clutch 31 is gradually engaged according to this duty ratio $\alpha$ (step 53). Thereafter, in step 54, judgment is made as to whether or not the engine rotation falling rate $\Delta N_E$ is equal to or more than a second setting $|x_2|$ ($|x_1| < |x_2|$). When the result of judgment is NO, the program returns to the aforementioned LEOFF routine S44' to repeat the loop for maintaining constant the engine rotation falling rate $\Delta N_E$. On the other hand, when the engine rotation falling rate $\Delta N_E$ is larger than $|x_1|$, judgment is made as to whether or not this engine rotation falling rate $\Delta N_E$ is equal to or larger than a third setting $|y_2|$ ($|x_2| < |y_2|$) (step 55). When the result of judgment is YES, the clutch 31 is gradually disengaged by off-duty (step 56) after execution of the LEOFF routine S44''. Then, judgment is made as to whether or not the engine rotation falling rate $\Delta N_E$ is equal to or less than a fourth setting $|y_1|$ ($|y_1| < |y_2|$) (step 57). When the result of judgment is NO, the loop for disengaging the clutch 31 is repeated. When, on the other hand, the result of judgment is YES, or when the result of judgment is NO in the aforementioned step 55 where judgment is made as to whether or not the engine rotation falling rate $\Delta N_E$ is equal to or less than $|y_2|$, or when the result of judgment is YES in the aforementioned step 54 where judgment is made as to whether or not the engine rotation falling rate $\Delta N_E$ is equal to or large than $|x_2|$, the engine rotation falling rate $\Delta N_E$ lies substantially within the hatched region shown in FIG. 10. Therefore, the condition is now satisfied in which the clutch 31 can be changed over from the semi-engaged state to the full-engaged state without accompanying any starting shock and without excessively extending the time required for starting the vehicle. The air pressure applied to the clutch 31 is held at the existing value (step 58). Then, the CPU 66 judges as to whether the difference between the engine rotation speed $N_E$ and the clutch rotation speed $N_{CL}$ is equal to or smaller than a predetermined setting (for example, $N_E - N_{CL}$ = about 100 rpm) in step 59. When the result of judgment is NO, the aforementioned loop is repeated. On the other hand, the result of judgment is YES at time $T_2$. A predetermined time lag from time $T_2$ is set (step 60), and, after this time lag, the electromagnetic valve 50 is full opened to attain the clutch-meet (step 61). Then, judgment is made as to whether or not the engine rotation speed $N_E$ is higher than the idling rotation speed (step 62). When the above condition is satisfied, and, after a predetermined time lag (step 63), the CPU 66 computes the slip rate of the clutch 31 (the difference between the engine rotation speed $N_E$ and the clutch rotation speed $N_{CL}$/the engine rotation speed $N_p$) and compares the value of the slip rate with a predetermined value (step 64). When the slip rate is less than the predetermined value, the program returns to the main flow. On the other hand, when the slip rate is larger than the predetermined value, the CPU 66 judges that the amount of wear of the clutch 31 is large and applies an ON signal or a clutch wear signal to the clutch warning lamp 76 through the output port 74 and through a drive circuit (not shown) thereby energizing the clutch warning lamp 76 (step 65).

Figure 8A:
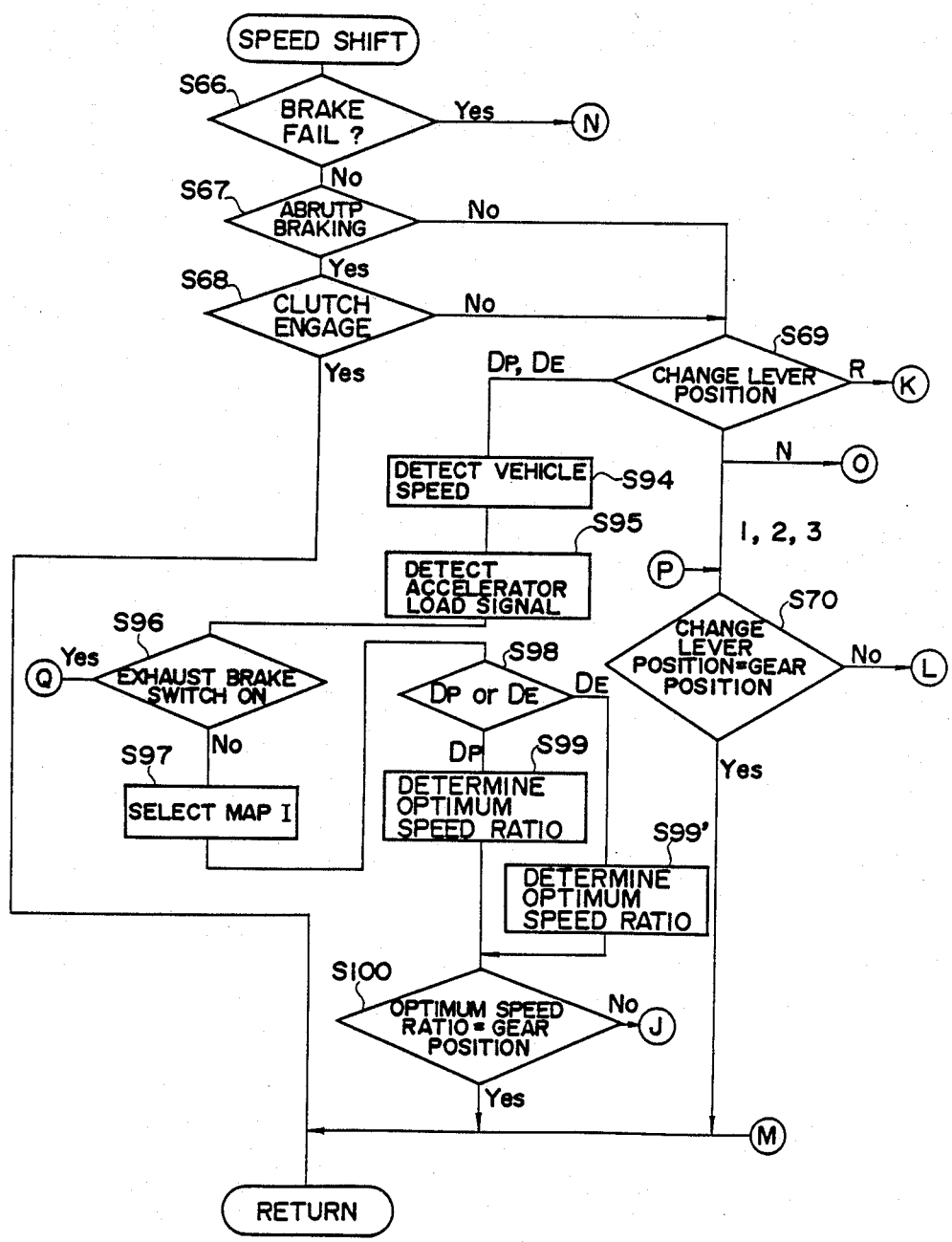
FIGS. 8(a), 8(b), 8(c), 8(d) are a flow chart showing an example of a control program.
Figure 8B:
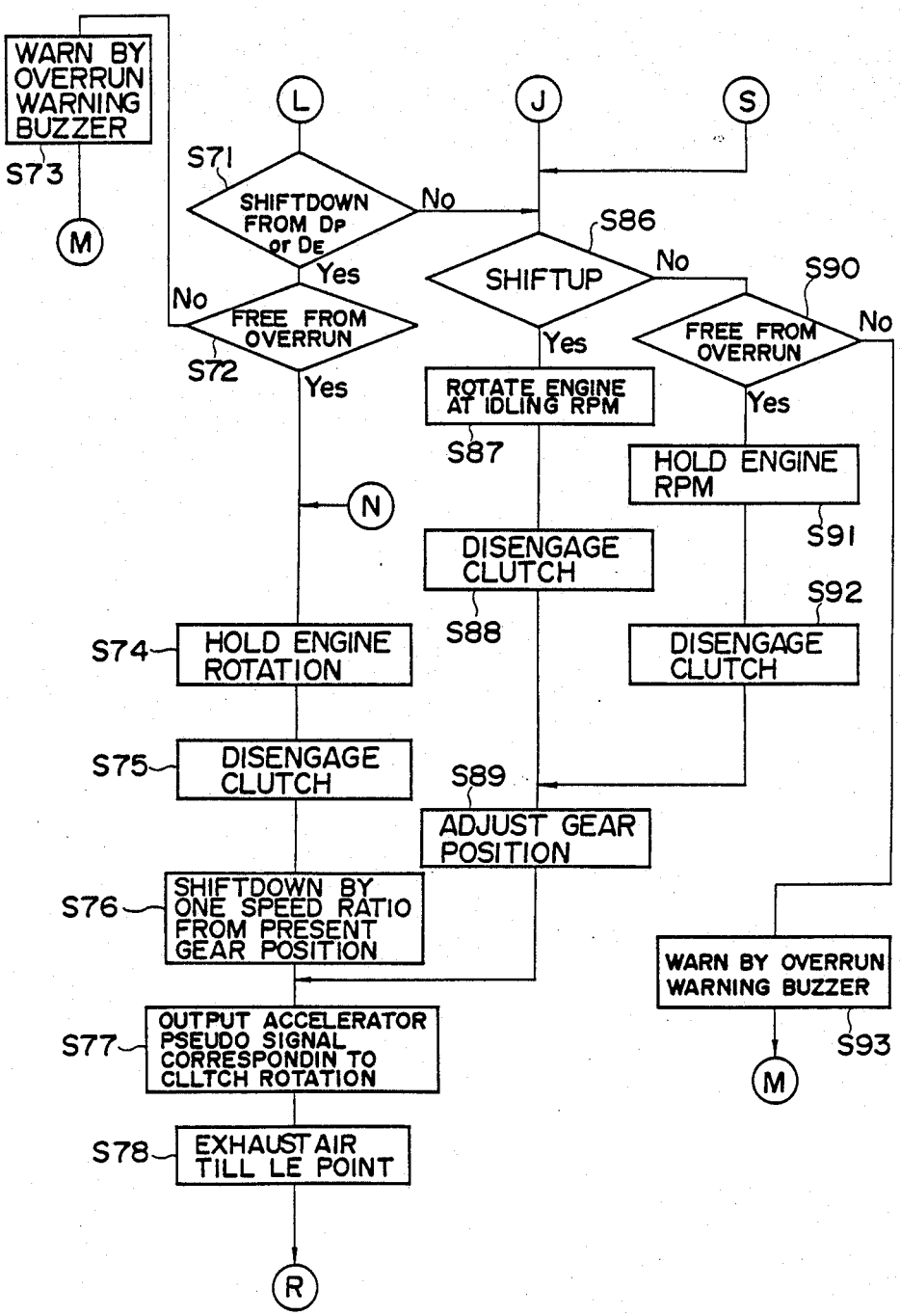
Figure 8C:
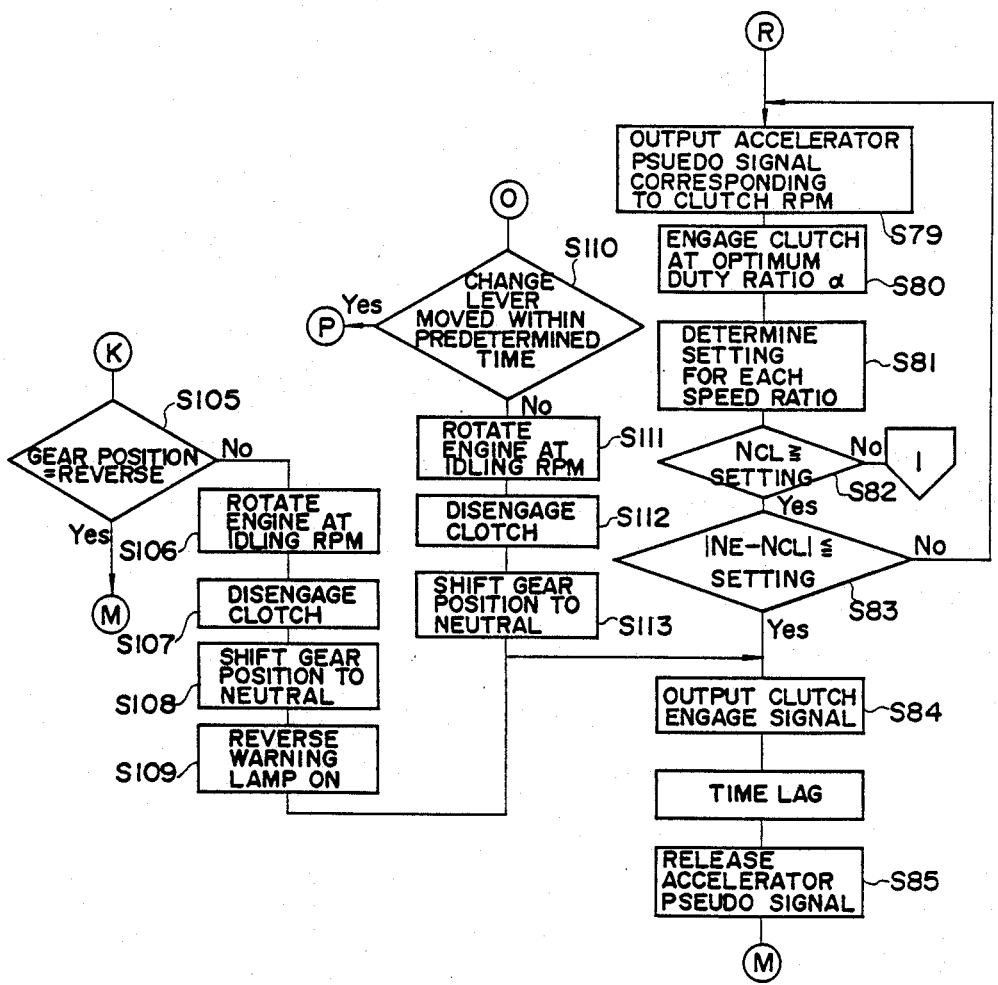

After completion of the vehicle starting routine, the CPU 66 reads the vehicle speed signal in step 2 shown in FIG. 5(a) and commences the speed shift routine S4 after judging that the vehicle speed exceeds the predetermined setting. As shown in FIGS. 8(a), 8(b) and 8(c), the CPU 66 applies first a select signal to the input 69 to check the presence of brake failure, if any (step 66). When the result of checking is YES because a brake failure exists, the CPU 66 acts to shift down the speed ratios one after another so as to stop the vehicle in a manner as described late. On the other hand, when the result of checking is NO because of the absence of any brake failure, whether or not the vehicle is being abruptly braked with a deceleration exceeding a certain constant is checked by the use of, for example, an acceleration sensor (step 67). When the result of checking is YES, the program returns through step 68 to the main flow to temporarily interrupt the speed shift operation described later, because execution of the speed shift operation results in a long braking distance. However, in the case where the clutch 31 is in its disengaged state even when the vehicle is being abruptly braked, such a case is judged to be midway of a speed shift, and the clutch 31 is engaged after the speed shift operation is completed.

On the other hand, when the vehicle is not being abruptly braked or when the clutch 31 is in its disengaged state as described above in spite of application of the abrupt braking, the CPU 66 reads the positon of the change lever 54 to judge whether the change lever 54 is positioned on one of the specified shift ranges 1, 2 and 3 except the $D_p$ and $D_E$ ranges, or one or the automatic shift ranges $D_p$ and $D_E$, or the R range or the N range (step 69).

Figure 11:
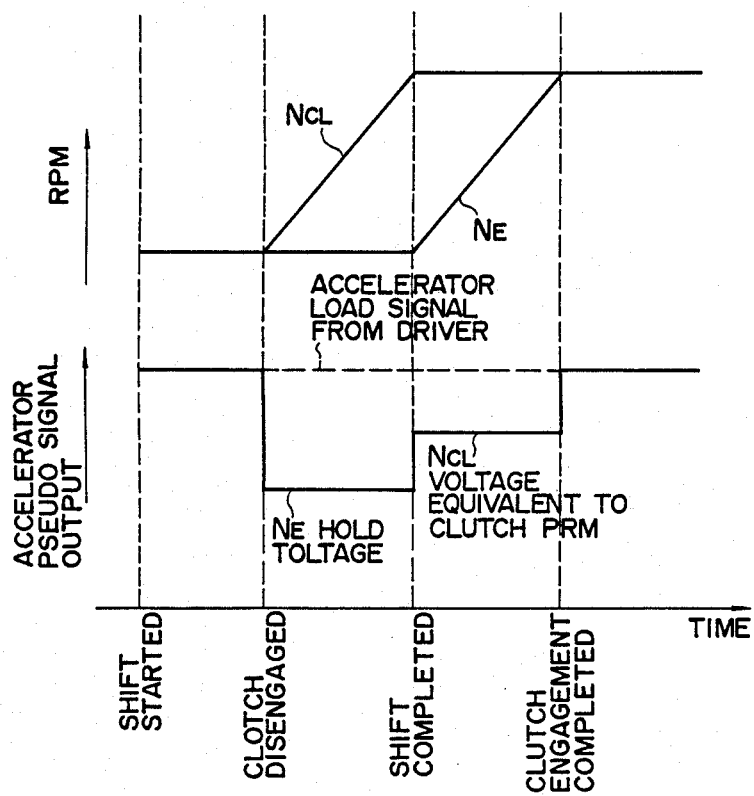

In the case of a shift in one of the specified shift ranges 1, 2 and 3, judgment is made in step 70 as to whether or not the gear position is the same as the position of the change lever 54. When the result of judgment is YES, the program returns to the main flow, while, when the result is NO, the step 70 is followed by step 71. As shown in FIG. 8(b), when the change lever 54 is positioned on a desired one of the ranges 1, 2 and 3, judgment is made in step 71 as to whether or not the present gear position before being shifted lies in the $D_p$ or $D_E$ range, and the speed shift corresponds to a shiftdown from that gear position. When the result of judgment YES, judgment is made as to whether or not the shiftdown can be achieved without causing an overrun of the engine 30 (step 72). On the other hand, when the result of judgment is NO, the step 71 is followed by step 73 where the overrun is warned to the driver by an overrun warning buzzer, and the program returns to the main flow without carrying out the speed shift. When the result of judgment on the overrun in step 72 is YES, the gear position is shifted down by one speed ratio from the present gear position (step 74 to 76). As shown in FIG. 11 which illustrates the concept of operation for this shiftdown, a control signal controlling the control rack 35 is applied to the electromagnetic actuator 38 through the output port 74 and microcomputer 65 to hold the engine rotation speed $N_E$ at the existing value (step 74). An ON signal is applied for a predetermined period of time to the cut valve 49 through the output port 74 to disengage the clutch 31 (step 75), and a control signal is applied to the individual electromagnetic valves 53 in the gear shift unit 51 to downshift the present gear position to the next lower gear position (step 76). Then, a voltage signal, which increases the engine rotation speed $N_E$ up to the same value as the clutch rotation speed $N_{CL}$, is applied as an accelerator pseudo signal to the electromagnetic actuator 38 through the output port 74 and microcomputer 65 (step 77), thereby attaining coincidence between the clutch rotation speed $N_{CL}$ and the engine rotation speed $N_E$ after the speed shift. Then, air is exhausted from the air cylinder 42 to urge the clutch 31 to its semi-engaged state corresponding to the LE point (steps 78, 79). Then, the clutch 31 is engaged at the optimum duty ratio α corresponding to the accelerator load signal (step 80). The difference between the engine rotation speed $N_E$ and the clutch rotation speed $N_{CL}$ is compared with the predetermined value previously set for each of the speed ratios (step 81), and the engagement of the clutch 31 at the optimum duty ratio is continued until $|N_E - N_{CL}|$ becomes equal or less than the setting (steps 81 to 83). After $|N_E - N_{CL}|$ decreases to less than the setting, a clutch engagement signal is generated to complete the engagement of the clutch 31 with a predetermined time lag (step 84), and the aforementioned accelerator pseudo signal is released (step 85). Then, the program returns to the main flow.

Figure 12:
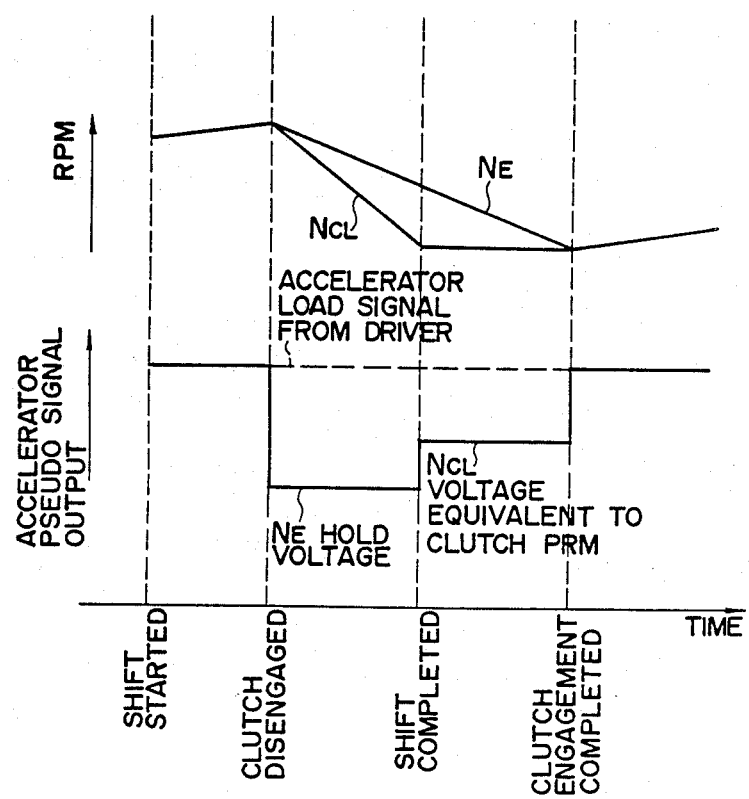

On the other hand, when the result of judgment as to whether or not the speed shift is a shiftdown from the $D_p$ or $D_E$ range, is NO, judgment is made as to whether or not the shift is a shiftup (step 86). When the result of judgment is YES, the following operation for the shiftup is carried out, and the program returns to the main flow. As shown in FIG. 12 which illustrates the concept of this shiftup operation, a control signal controlling the control rack 35 is applied to the electromagnetic actuator 38 through the output port 74 and microcomputer 65 to decrease the engine rotation speed $N_E$ to the idling rotation speed (step 87). After disengaging the clutch 31 (step 88), a control signal is applied through the output port 74 to the individual electromagnetic valves 53 so that the gear position coincides with the desired speed ratio in one of the specified shift ranges 1, 2 and 3 (step 89). Thereafter, the aforementioned steps starting from the application of the accelerator pseudo signal for the shiftdown operation are executed thereby attaining coincidence of the engine rotation speed $N_E$ with the clutch rotation speed $N_{CL}$ after the shift, and engagement of the clutch 31 is completed to return the program to the main flow (steps 77 to 85). When the result of judgment as to whether or not the shift is a shiftup is NO, judgment is made as to whether or not the engine 30 is free from overrun (step 90). When the result of judgment is YES, the engine rotation speed $N_E$ is held at the existing value (step 91), and the clutch 31 is disengaged (step 92) so that the gear position coincides with the desired speed ratio in one of the specified shift ranges 1, 2 and 3 (step 89). Then, the aforementioned steps starting from the application of the accelerator pseudo signal for the shiftdown operation are executed, and the program returns to the main flow. On the other hand, when the result of judgment as to whether or not the engine is free from overrun is NO, warning is given by the overrun warning buzzer (step 93).

Figure 13:
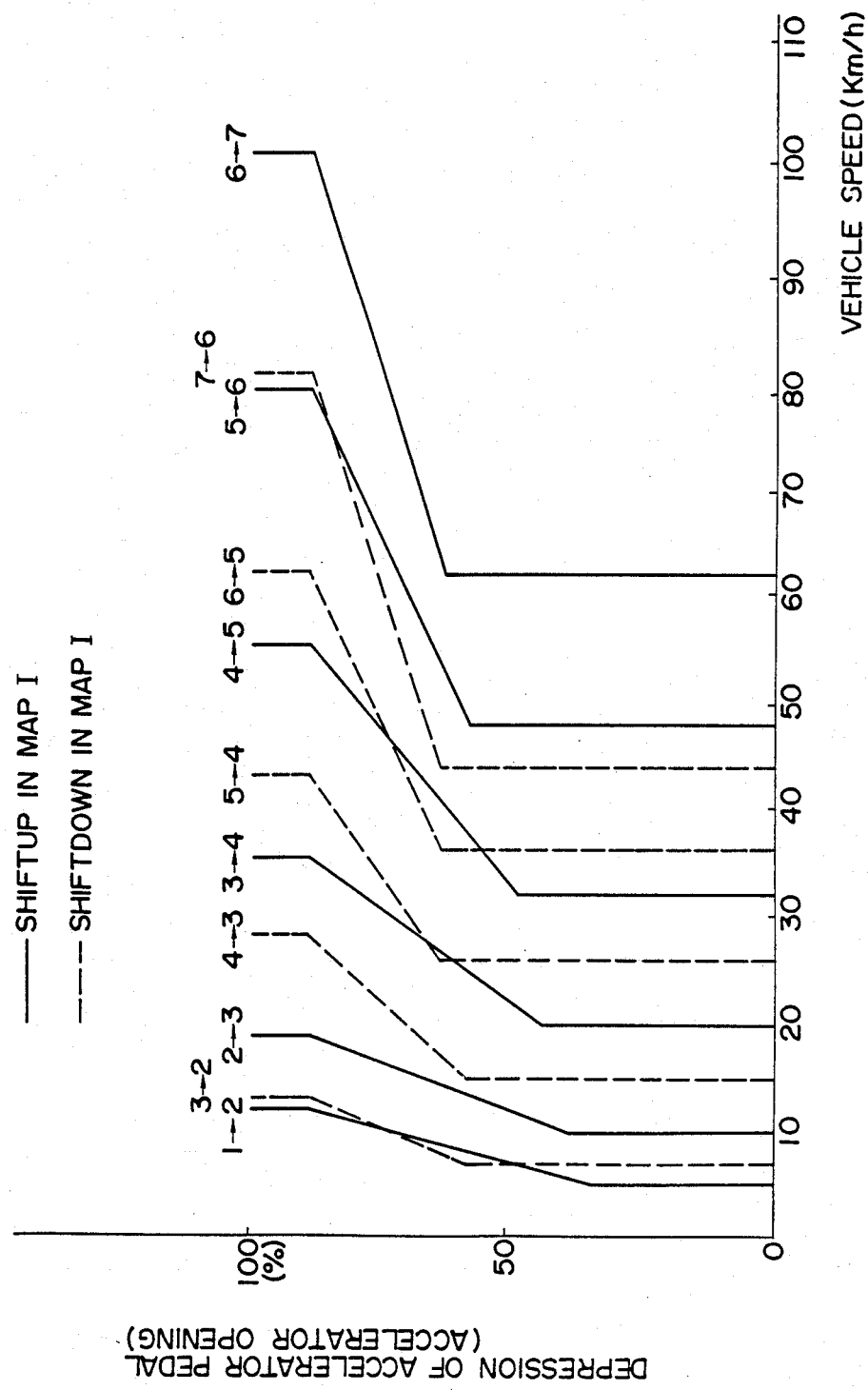

The above operation is carried out when the result of judgment of the position of the change lever 54 proves that the change lever 54 is positioned on one of the specified shift ranges 1, 2 and 3. However, when the result of judgment of the position of the change lever 54 in the step 69 in FIG. (a) proves that the change lever 54 is positioned on the automatic shift range $D_p$ or $D_E$, the following operation is carried out. That is, the vehicle speed and the amount of depression of the accelerator pedal 37 are detected (steps 94, 95), and judgment is made as to whether or not the exhaust brake device is operated (step 96). When the result of judgment is NO, a map I as shown in FIG. 13 is selected (step 97). Then, judgment is made as to whether the change lever 54 is positioned on the $D_p$ range or the $D_E$ range (step 98), and an optimum speed ratio considered to be the desired speed ratio in the $D_p$ or $D_E$ range is determined on the basis of the pre-set map I shown in FIG. 13 (step 99, 99'). Then, judgment is made in step 100 as to whether or not the gear position matches this optimum speed ratio. When the result of judgment is YES, the program returns to the main flow, while, when the result of judgment is NO, the step 100 is followed by the step 86 of judgment for a shiftup, and the same shift operation as that described above is carried out.

In the map I shown in FIG. 13, the speed shifts in the $D_P$ and $D_E$ ranges are represented by the same lines (solid limes in the case of shiftup and dotted lines in the case of shiftdown) for ease of understanding of the shiftup and shiftdown. Actually, however, the shifts in the $D_P$ range are set on a higher speed side than those in the $D_E$ range, as shown in FIG. 3.

Figure 8D:
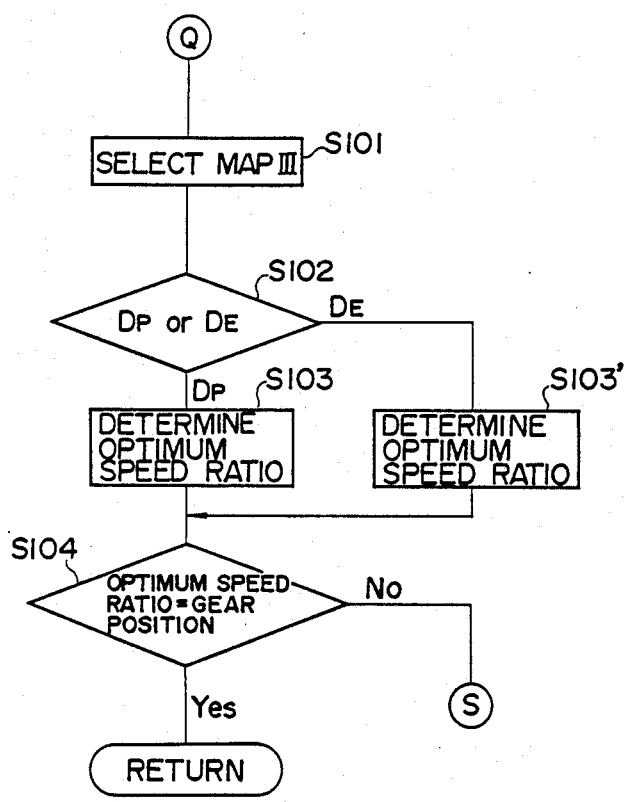
Figure 14:
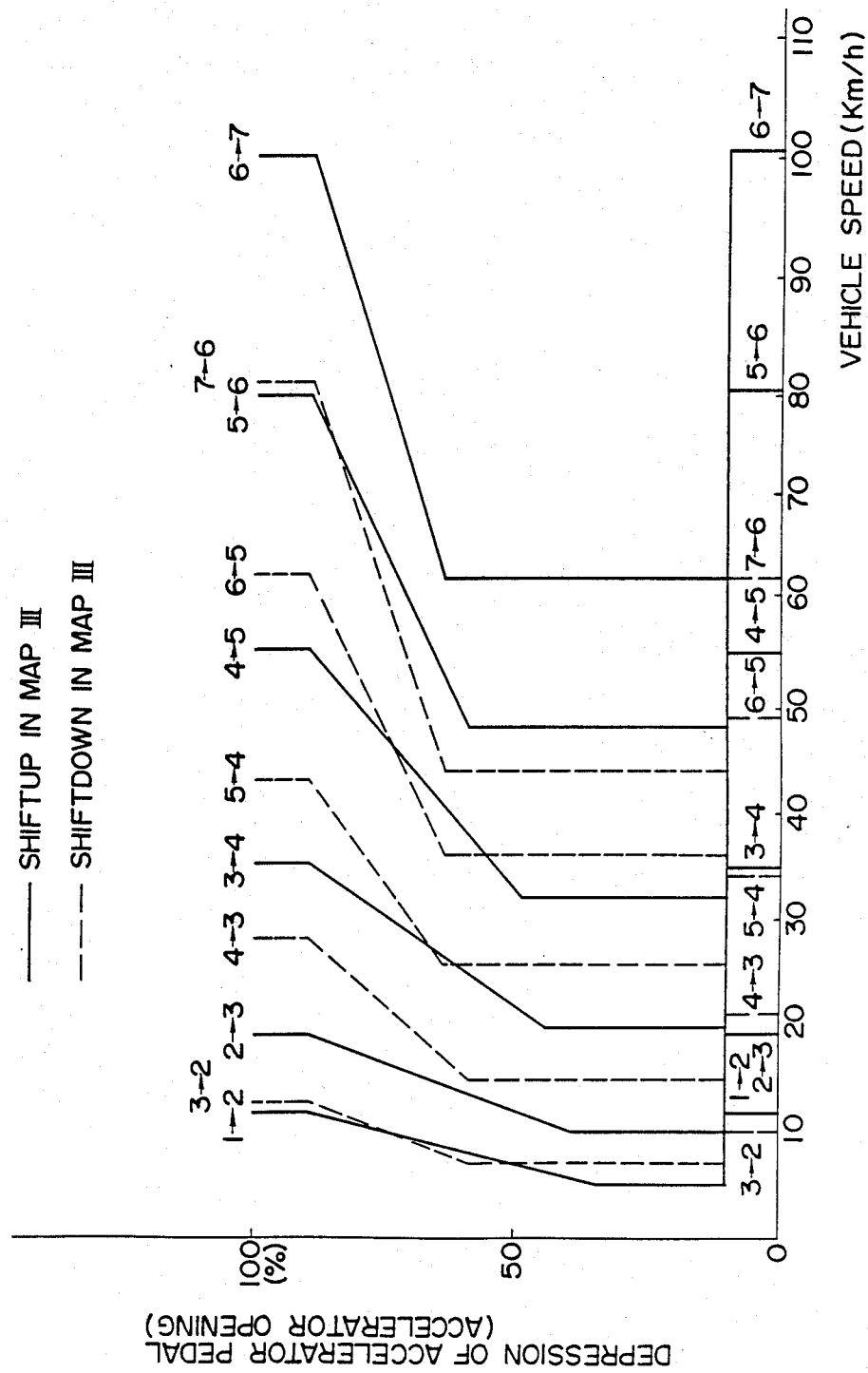

A map III as shown in FIG. 14 is selected when the exhaust brake device is operated. As shown in FIG. 14, in this map III, the vehicle speed at which the gear position is shifted to a higher speed ratio when the accelerator pedal 37 is not depressed by the driver is set at a further higher speed side. That is, when, for example, the vehicle runs on a descent, while the exhaust brake device is under operation, and the accelerator pedal 37 is not depressed by the driver, the gear position is held at a lower speed ratio, and the effect of exhaust braking as well as the effect of engine braking can be more enhanced, even when the vehicle speed increases. This is because the vehicle speed at which the gear position is shifted to a higher speed ratio is set at the higher speed side. In FIG. 8(d), when the map III is selected (step 101), judgment is made as to whether the change lever 54 is positioned on the $D_P$ range or $D_E$ range (step 102). An optimum speed ratio considered to be the desired speed ratio in the $D_P$ range or $D_E$ range is determined on the basis of the map III (step 103 or 103'), and, then, judgment is made as to whether the gear position matches this optimum speed ratio (step 104). When the result of judgment is YES, the program returns to the main flow, while, when the result of judgment is NO, the program shifts to the aforementioned step of judgment for a shiftup, and shift operation similar to that described above is carried out.

Figure 15:
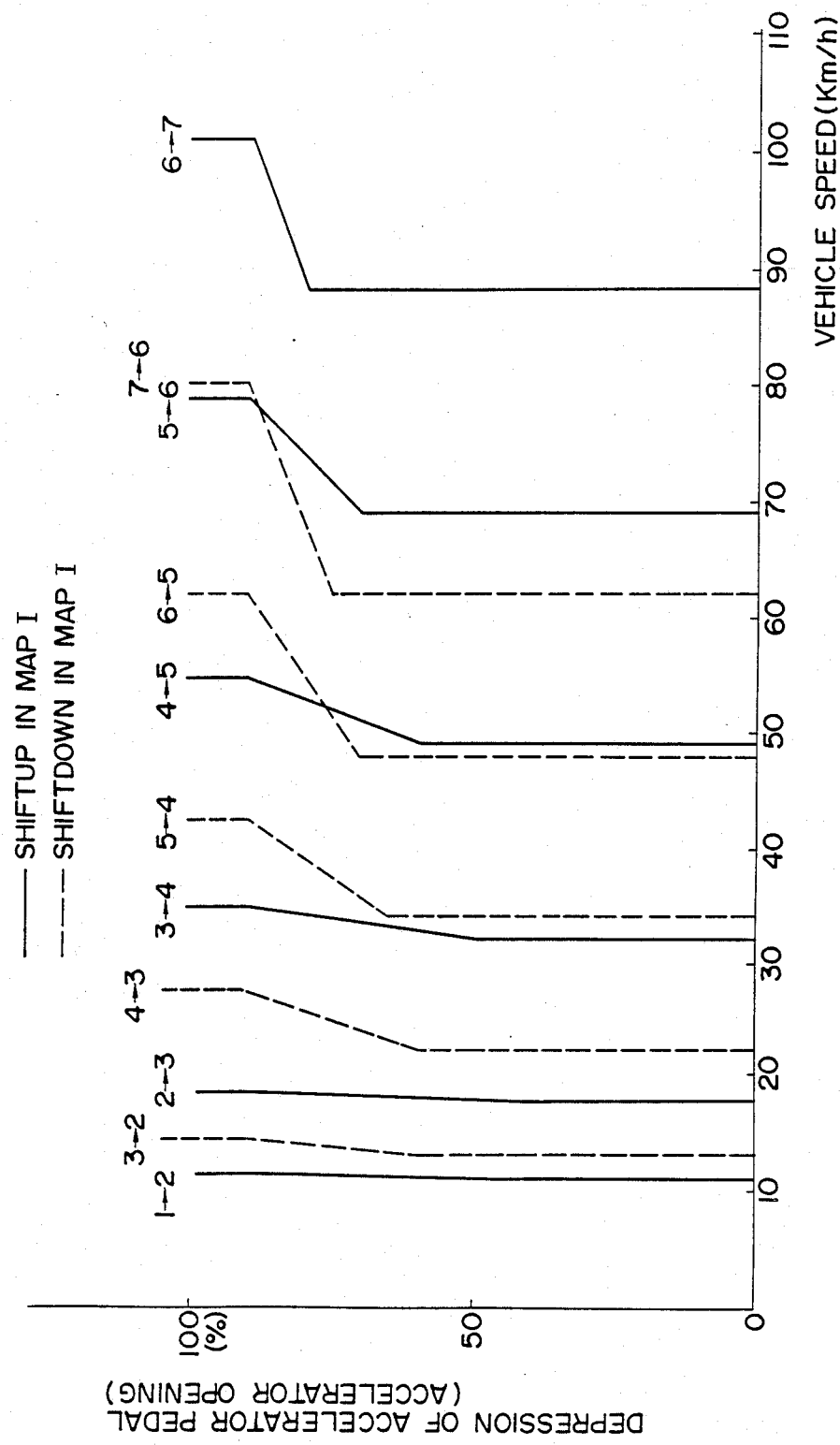
Figure 16:
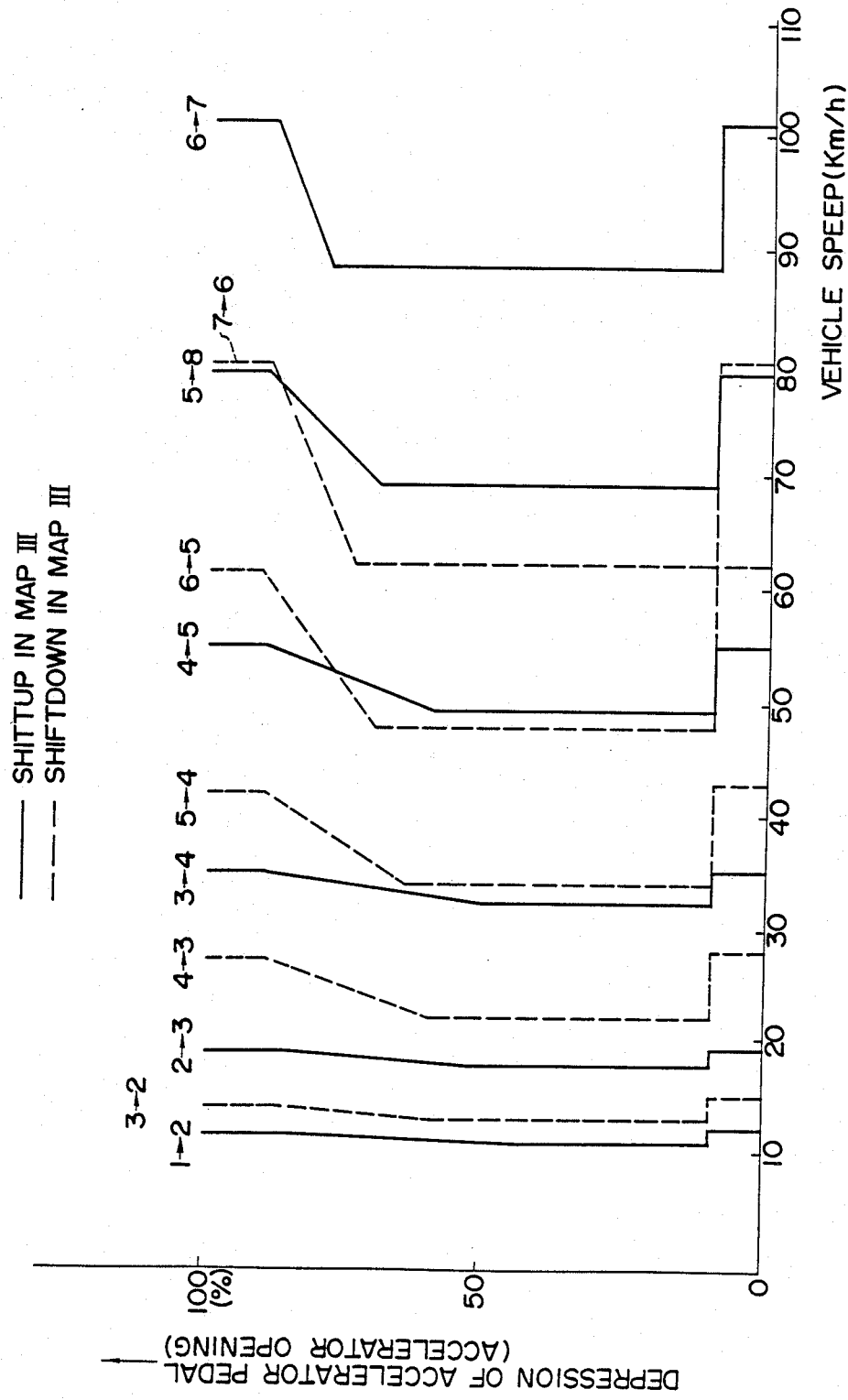

In the first embodiment described above, the graphs shown in FIGS. 13 and 14 are used as the maps I and III respectively. However, in a modification of the first embodiment, graphs as shown in FIGS. 15 and 16 can be used as these maps.

Figure 17:
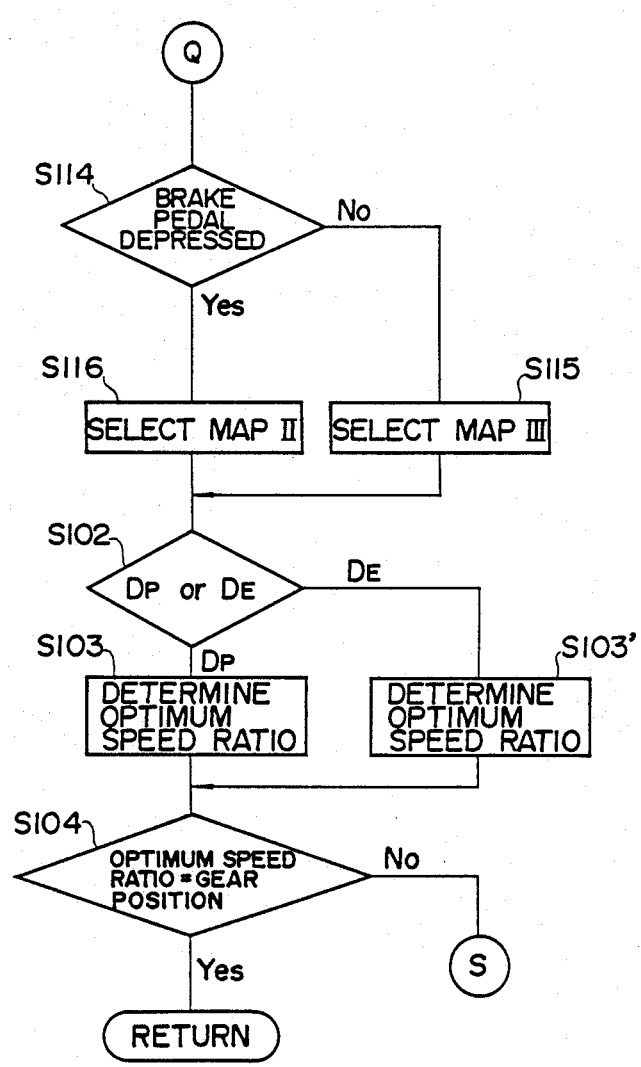
FIG. 17 is a flow chart showing a control program in a second embodiment of the present invention.

Further, in the aforementioned first embodiment, one of the maps I and III is selected depending on whether or not the exhaust brake device is operated. A second embodiment which is a more concrete modification of the first embodiment will be described with reference to FIGS. 15 and 16. The second embodiment differs from the first embodiment in that FIG. 8(d) of the first embodiment is replaced by a flow chart shown in FIG. 17. In FIG. 17, the same numerals are used to designated steps which are substantially the same as those appearing in FIG. 8(d). In the case of the first embodiment, the map is selected immediately when the exhaust brake device is operated. In contrast, in the second embodiment, when the exhaust brake device is under operation, judgment is made in step 114 as to whether or not the brake pedal 61 is being depressed by the driver. The map III shown in FIG. 16 is selected when the brake pedal 61 is not depressed (step 115). In this map III, the vehicle speed at which the gear position is shifted to a lower speed ratio when the brake pedal 37 is not depressed by the driver is set at a higher speed side than in the case where the exhaust brake device is not operated. That is, a shiftdown is facilitated when, for example, the vehicle is running on a descent, while the exhaust brake device is under operation, and the accelerator pedal 37 is not depressed by the driver, so that the effect of exhaust braking as well as the effect of engine braking can be enhanced. When, on the other hand, the brake pedal 61 is depressed, a map II as shown in FIG. 18 is select of exhaust braking as well as the effect of engine braking can be more powerfully exhibited. This is because the vehicle speed at which the gear position is shifted to a lower speed ratio is set at a higher speed side than in the case of the map III, thereby further facilitating the shiftdown.

When the exhaust brake device is under operation, and the accelerator pedal 37 is not depressed by the driver, the vehicle speed at which the gear position is shifted to a higher speed ratio is set at a speed corresponding to (the engine's maximum rotation speed $\times \alpha$) regardless of the state of depression of the brake pedal 61. Therefore, even when the vehicle speed increases as when the vehicle runs on a descent, the gear position is maintained at a lower speed ratio, thereby further enhancing the effect of exhaust breaking as well as the effect of engine braking.

When the map II or map III is selected, judgment is made as to whether the change lever 54 is in the $D_P$ range or in the $D_E$ range (step 102), and, on the basis of the map II or map III, an optimum speed ratio considered to be the desired speed ratio in the $D_P$ range or $D_E$ range is determined (step 103 or 103'). Then, judgment is made as to whether or not the gear position matches the optimum speed ratio (step 104). When the result of judgment is YES, the program returns to the main flow, while, when the result of judgment is NO, the program shifts to the aforementioned step of judgment for a shiftup, and shift operation similar to that described already is carried out.

The flow which follows the execution of the various steps described above is common to both the first embodiment and the second embodiment. The flow in these two embodiments will be collectively described. When the result of judgment of the position of the change lever 54 proves that the change changer 54 is in the R range, judgment is made by the CPU 66 as to whether or not the gear position coincides with the R range (step 105). When the vehicle is now running backward, and the result of judgment is YES, the program returns to the main flow. On the other hand, when mal-manipulation occurs, and the result of judgment is NO, the engine rotation speed $N_E$ is decreases to the idling rotation speed, and the clutch 31 is disenged, as described already (steps 106, 107). In order to restore the gear position to the neutral, the CPU 66 applies a signal to the individual electromagnetic valves 53 through the output parts 74, and, after energizing a reverse warning lamp informing a shift error, the clutch 31 is engaged to return the program to the main flow (steps 108, 109, 84, 85).

Further, when the result of judgment of the position of the change lever 54 proves that the change lever 54 is in the N range, judgment is made as to whether or not the change lever 54 is in the N range, judgment is made as to whether or not the change lever 54 has been moved within a predetermined period of time, that is, whether or not the N position has been merely passed during the shifting manipulation by the driver, as shown in FIG. 8(c) (step 110). When the change lever 54 has merely passed the N position during the shifting manipulation, and the result of judgment is YES, the position of the change lever 54 and the gear position are judged as described already (step 70). Then, the program returns directly to the main flow or returns to the main flow after manipulation for a shiftup or a shiftdown. However, when the N range is selected, and the result of judgment is NO, the engine rotation speed $N_E$ is decreased to the idling rotation speed (step 111), and the clutch is disengaged (step 112). After shifting the gear position to the neutral (step 113), the clutch 31 is engaged again, and the program returns to the main flow (steps 84, 85).

According to the first embodiment of the shift control apparatus of the present invention, the conventional drive system including the clutch and gear transmission is used intact, and air from the air tank of the vehicle is used as a control medium for actuating the clutch actuator and the poser cylinders of the gear position changeover means to attain a speed shift. Therefore, an automatic transmission system of low cost can be provided without greatly improving the existing vehicle production equipment. Further, the vehicle speed at which the gear position is shifted to a higher speed ratio when the exhaust brake device is under operation, and the accelerator pedal is not depressed by the driver, is set at a higher speed side. Therefore, when for example, the vehicle is running on a descent, while the exhaust brake device is under operation, and the accelerator pedal is not depressed by the driver, the gear position is maintained at a lower speed ratio in spite of an increase in the vehicle speed, so that the effect of exhaust braking as well as the effect of engine braking can be more enhanced. According to the second embodiment, the three kinds of maps I, II and III are suitable selected. Therefore, the effect of capability of attaining a shift with less shock is added to the aforementioned effects.

A third embodiment of the present invention will be described with reference to FIGS. 19 to 21. In the first and second embodiments, the shift pattern or map I shown in FIG. 15 is selected when the exhaust brake device is not operated, while, the maps III and II shown in FIGS. 14 and 18 respectively are selected when the exhaust brake device is operated. The third embodiment differs from the first and second embodiments in the following point in addition to the above manner of map selection. That is, when the exhaust brake device only is operated, the speed value is shifted to a relatively higher speed side in the map III or map II in the case of a shiftup, while, the speed value is shifted to a relatively lower speed side in the case of a shiftdown, thereby decreasing the number of times of speed shifts. According to the third embodiment, the speed shift pattern for a speed shift from one speed ratio to another is classified into that for a general running mode refer to FIGS. 19(a) and 19(d), the for a mode in which the exhaust brake device only is under operation refer to FIGS. 19(b) and 19(e), and that for a mode in which both the exhaust brake device and the brake pedal 61 are operated [refer to FIGS. 19(c) and 19(f)]. Further, the pattern is classified depending on a shiftup mode [refer to FIGS. 19(a), 19(b), and 19(c)] and a shiftdown mode [refer to FIGS. 19(d), 19(e) and 19(f)]. On the basis of the individual patterns, example, according to the pattern shown in FIG. 19(e) corresponding to the case where the exhaust brake device only is operated in the shiftdown mode, a speed ratio selection map as shown in FIG. 20 is determined. (FIG. 20 corresponds to the dotted-line map shown in FIG. 14). Six kinds of such speed ratio selection maps corresponding to FIGS. 13, 14 and 19 are prepared and stored in the control unit 52 of the automatic transmission system shown in FIG. 1. The third embodiment has a structure similar to that of the first and second embodiments shown in FIG. 1.

The manner of speed shift when the vehicle starts to run on a descent from its general running mode will now be described.

Suppose first that the vehicle carrying a load runs on a relatively gentle descent. As the vehicle speed increases, the exhaust brake switch 61' is immediately turned on, and the shift control according to the speed ratio selection map corresponding to the pattern shown in FIG. 19(b) takes place. Suppose that P1 is the value of the vehicle speed at that time, and the vehicle speed increases in spite of application of both the exhaust braking and the engine braking. In this case, the length of time to be elapsed until attainment of a shiftup speed value P2 exceeds a prior art speed value P3 and thus has a sufficient time margin. Therefore, the engine braking can be applied for a period of time longer than hitherto, thereby retarding the timing of the shiftup. The vehicle may continue to run without any speed shift in some circumstances.

Suppose then that the speed of the vehicle running on a descent without carrying any load is decreased by the effects of exhaust braking and engine braking. In such a case, the shift control based on the pattern shown in FIG. 19(e) and according to the speed ratio selection map shown in FIG. 20 takes place. Suppose that P5 is the value of the vehicle speed at that time, and the vehicle speed is decreased from P5 by the function of the exhaust braking and engine braking. In this case too, there is a sufficient time margin exceeding a prior art value P4 until a shiftdown speed value P6 is reached. Therefore, the timing of the shiftdown can be sufficiently retarded, and, in some circumstance, the vehicle may continue to run without any speed shift.

Suppose next that the vehicle runs on a relatively steep descent, and the main brake device (of hydraulic type) actuated by the brake pedal 61 is operated in addition to the exhaust brake device. In the case of the shift control in such a case, the speed ratio selection map based on the pattern shown in FIG. 19(c) is employed when the vehicle speed further increases, while, the speed ratio selection map based on the pattern shown in FIG. 19(f) is employed when the vehicle speed decreases conversely, thereby controlling the shiftup or shiftdown. In each of these cases, the main brake device operates. Therefore, coasting during the speed shift can be avoided, and there is no need for retarding the timing of shiftdown in the vicinity of zero opening of the accelerator. Thus, the patterns shown in FIGS. 19(c) and 19(f) are closely analogous to each other, and there is a slight difference there between such that the speed in the shiftdown mode is generally lower than that in the shiftup mode.

According to the third embodiment, the speed value is shifted toward a relatively higher speed side in a shiftup mode, while, the speed value is shifted toward a relatively lower speed side in a shiftdown mode, when the exhaust brake device only is operated to impart a relatively weak braking force to the running vehicle. Therefore, the number of required speed shifts can be decreased. Further, importation of an excessive braking force by exhaust braking and engine braking due to a premature shiftdown can be avoided. Also, narrowing of the engine braking range due to a premature shiftup and coasting due to disengagement of the clutch 31 can be avoided.

Figure 22A:
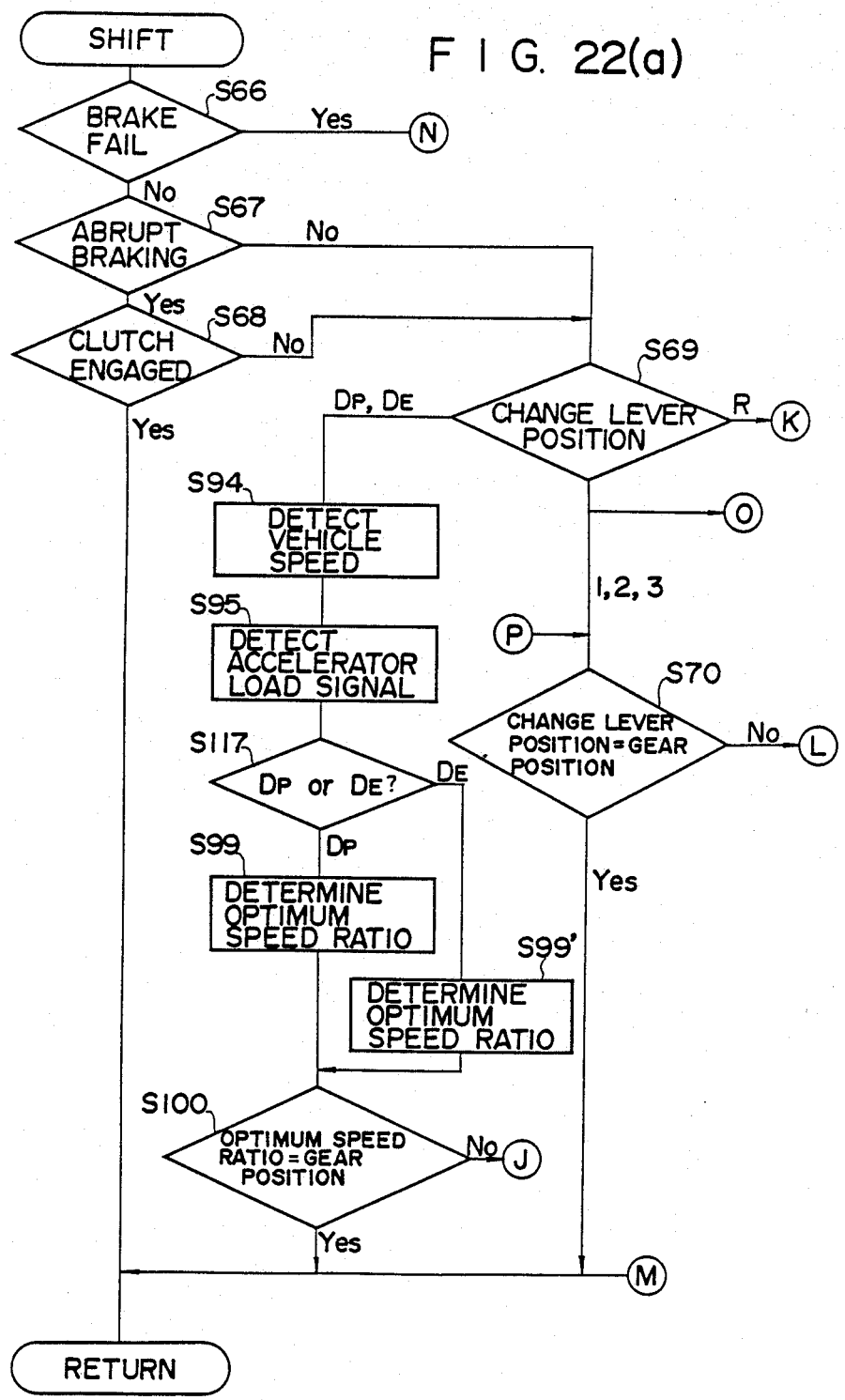
Figure 22B:
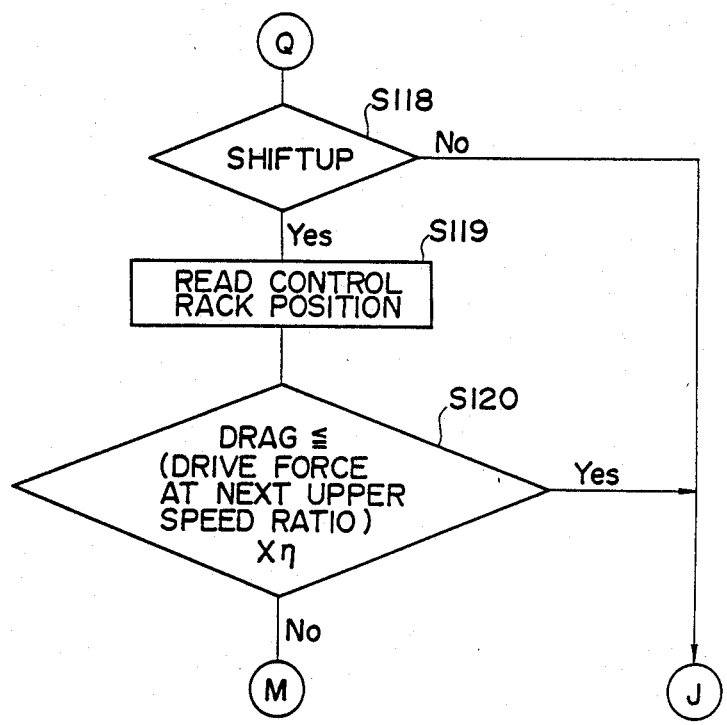

A fourth embodiment of the present invention will now be described with reference to FIGS. 1, 22 and 23. This fourth embodiment is featured in that the drag is computed from the present drive force and present accelerating force based on the stroke position of the control rack 35, and no speed shift is carried out when the computed drag exceeds the effective drive force to be developed at the next speed ratio. The fourth embodiment differs from the first embodiment in that FIG. 8 referred to in the first embodiment is replaced by FIGS. 22(a) and 22(b), that FIG. 23 is newly added, and that a rack position sensor 77 as shown in FIG. 1 is provided.

The part of the fourth embodiment which differs from the first embodiment will be described while omitting the part common to the first embodiment. The same numerals are used to denote the same steps as those executed in the first embodiment. The numeral 77 in FIG. 1 designates a control rack sensor which is associated with the injection pump 34 to apply a signal indicative of the position of the control rack 35 to the control unit 52. Referring to FIG. 22(a), the vehicle speed and the amount of depression of the accelerator pedal 37 are detected (steps 94, 95), and judgment is made is step 117 as to whether the change lever 54 is in the $D_P$ range or in the $D_E$ range. An optimum speed ratio considered to be the desired sped ratio in the $D_P$ range or $D_E$ range is determined on the basis of the pre-set map shown in FIG. 3 (step 99). Then, judgment is made as to whether or not the gear position matches the optimum speed ratio (step 100). When the result of judgment is YES, the program returns to the main flow. On the other hand, when the result of judgment is NO, that is, when the gear position does not coincide with the optimum speed ratio, judgment is made in step 118 as to whether or not a shiftup is required, as shown in FIG. 22(b). When the result of judgment proves that the shiftup is not required, operation similar to that described already is carried out, and the program returns then to the main flow. In contrast, when the shiftup is made while the vehicle runs on, for example, an ascent, and the engine 30 has not a substantial margin of power, the vehicle speed will decrease and the vehicle speed may not be maintained at the value developed before being shifted up, even when the control rack 35 of the injection pump 34 of the fuel injection device is urged to its full stroke position. In such a case, shift operation will be such that the shiftup is immediately followed by a shiftdown to the former speed ratio again, resulting in wasteful shift operation. Such a wasteful shift must be prevented. To this end, when the result of judgment proves that a shiftup is required, the position of the control rack 35 of the injection pump 34 is sensed by the rack position sensor 77 (step 119) to find the present drive force, and the drag of the vehicle is computed from the drive force and accelerating force, so that the shiftup can be effected only when this drag is smaller than the effective drive force developed at the next speed ratio. FIG. 23 shows the drag and drive force relative to the vehicle speed. The present drive force F at a speed ratio (for example, an nth speed ratio) can be computed by multiplying (the present control rack position S)/(the full stroke $S_f$) by the drive force $P_n$ developed at the nth speed ratio. $P_n$ is expressed as $P_n = T_E \cdot \gamma_o \cdot R_t$, where $T_E$ is the engine torque, is the total gear ratio at the nth speed ratio, and $R_t$ is the tire radius. The accelerating force B can be computed by multiplying the acceleration $\Delta V/\Delta t (m/s^2)$ by the vehicle weight W/g. The drag A can be computed by subtracting the accelerating force B from the present drive force F. The vehicle is considered to have a sufficient margin of power when there is the relation $P_{n+1} \times \eta \geq A$ between the drag A and the drive force $P_{n+1}$ at the (n+1)th speed ratio. Therefore, in the case of a shiftup, judgment is made as to whether or not the drag is equal to or smaller than $\eta \times P_{n+1}$ after reading the position of the rack, and the rack, and the speed ratio is shifted up only when the result of judgment is YES. When the result of judgment is NO, the program returns to the main flow. In the above expression, the symbol $\eta$ is the efficiency at each speed ratio and determined form a pre-set map on the basis of the factors including the weight of the load (the total weight of the vehicle body), the gradient of the slope and the necessary acceleration after the speed shift. In FIG. 23, the present drive force F, drag A and drive force $P_n$ at the nth speed ratio are shown on the same vehicle speed for convenience of illustration. Actually, however, the vehicle speed decreases at the time of the speed shift, and the present drive force F and drag A are represented by those on the two-dot chain line.

According to the fourth embodiment of the present invention, the position of the control rack 35 and the acceleration of the vehicle are sensed at the time of an upshift to compute the present drive force F and acceleration force B thereby computing the drag A, and no shift operation is carried out when the computed drag A exceeds the effective drive force at the next speed ratio. Therefore, the fourth embodiment is that a wasteful shift operation is dispensed with when the engine 30 has not a substantial margin of power.

Figure 24:
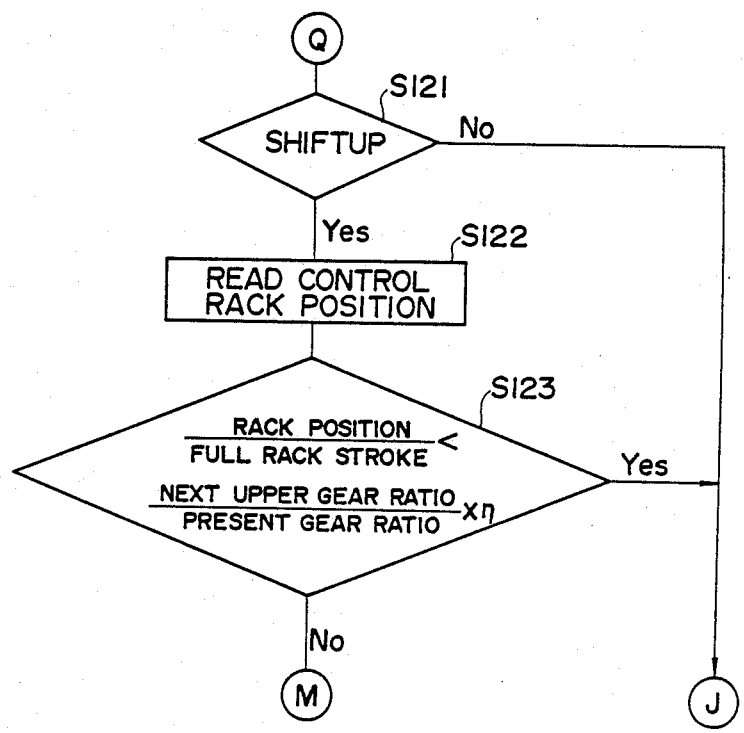
FIG. 24 is a flow chart showing an example of a control program in a fifth embodiment of the present invention.
Figure 26:
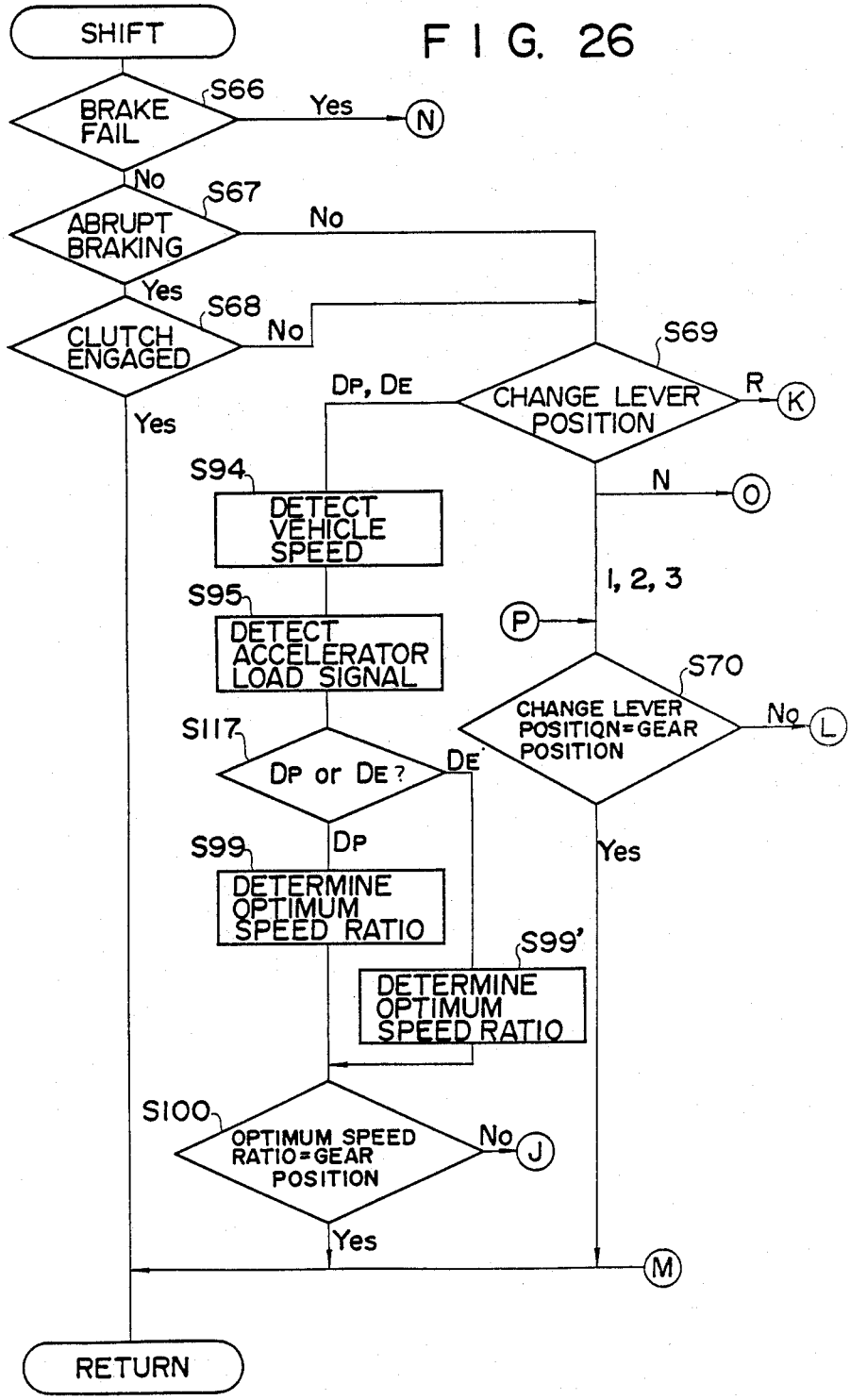
FIG. 26 is a flow chart showing an example of a control program in a seventh embodiment of the present invention.

A fifth embodiment of the present invention will next be described. In addition to the features of the first embodiment, this fifth embodiment is featured in that, at the time of change-over of the gear position to a higher speed ratio while the vehicle is running on, for example, an ascent, the position of the control rack 35 of the fuel injection device at that time is sensed, the control unit 52 judges as to whether or not the vehicle speed can be increased to a value higher than that developed before the shift when the control rack 35 is urged to its full stroke positon, and, when the result of judgment proves that the higher vehicle speed cannot be maintained, the change-over of the gear position to the higher speed ratio is not carried out. As in the case of the fourth embodiment, the fifth embodiment differs from the first embodiment in FIG. 8 of the drawings. The fifth embodiment will be described mainly with reference to FIG. 24 and FIG. 22(a) referred to in the fourth embodiment. In the following description, the part which differs from the first embodiment will only be described, as in the case of the fourth embodiment. Referring to FIG. 22(a), the vehicle speed and the amount of depression of the accelerator pedal 37 are sensed (steps 94, 95), and judgment is made as to whether the change lever 54 is positioned on the $D_P$ range or the $D_E$ range (step 117). An optimum speed ratio considered to be the desired speed ratio in the $D_P$ range or $D_E$ range is determined on the basis of the pre-set map shown in FIG. 3 (step 99). Then, judgment is made as to whether or not the gear position matches the optimum speed ratio (step 100). When the result of judgment is YES, the program returns to the main flow. On the other hand, when the result of judgment is NO, that is, when the gear position does not coincide with the optimum speed ratio, judgment is made in step 121 as to whether or not a shiftup is required, as shown in FIG. 24. When the result of judgment proves that the shiftup is not required, operation similar to that described already is carried out, and the program returns then to the main flow. In contrast, when the shiftup is made while the vehicle runs on, for example, an ascent, and the engine 30 has not a substantial margin of power, the vehicle speed will decrease, and the vehicle speed may not be maintained at the value developed before being shifted up, even when the control rack 35 of the injection pump 34 of the fuel injection device is urged to its full stroke position. In such a case, shift operation will be such that the shiftup is immediately followed by a shiftdown to the former speed ratio again, resulting in wasteful shift operation. Such a wasteful shift must be prevented. To this end, when the result of judgment proves that a shiftup is require, the position of the control rack 35 of the injection pump 34 is sensed by the rack position sensor 77 to find the margin of power of the vehicle, and the shiftup is permitted only when there is a sufficient power margin. More precisely, after reading the rack position in step 122, judgment is made as to whether or not (the present control rack position S)/(the rack full stroke $S_f$) is smaller than $\eta \times$(the next higher gear ratio)/(the present gear ratio) (step 123). The shift operation is carried out only when the result of judgment is YES. On the other hand, when the result of judgment is NO, the program returns to the main flow. The flow of succeeding steps is the same as that in the preceding embodiments.

According to the fifth embodiment of the present invention, the position of the control rack 35 of the injection pump 34 is sensed at the time of an upshift, and no shift operation is carried out when the result of judgment of the aforementioned relation proves that the vehicle speed developed before the speed shift cannot be maintained even when the control rack 35 is urged to its full stroke position. Therefore, the fifth embodiment is advantageous in that a wasteful shift operation is dispensed with.

A sixth embodiment of the present invention will next be described. This sixth embodiment is featured in that the gear position is not changed over to a lower speed ratio when the vehicle is being braked. As in the case of the fourth and fifth embodiments, the sixth embodiment differs mainly from the first embodiment in FIG. 8 of the drawings. In other words, when compared with the fourth embodiment, the sixth embodiment differs in that FIG. 22(b) is changed to FIG. 25, and the remaining flow charts are the same. The part which differs from the first embodiment will only be described mainly with reference to FIGS. 22(a) and 25. Referring to FIG. 22(a), the vehicle speed and the amount of depression of the accelerator pedal 37 are sensed, and judgment is made as to whether the change lever 54 is positioned on the $D_P$ range or the $D_E$ range (step 117). As optimum speed ratio considered to be the desired speed ratio in the $D_P$ range or $D_E$ range is determined on the basis of the pre-set map shown in FIG. 3 (step 99). Then, judgment is made as to whether or not the gear position matches the optimum speed ratio (step 100). when the result of judgment is YES, the program returns to the main flow. On the other hand, when the result of judgment is NO, judgment is made as to whether or not the brake pedal 61 is depressed as shown in FIG. 25, that is, whether or not the vehicle is being braked (step 124). Also, judgment is made as to whether the speed ratio is being shifted down from the 5th speed to the 4th speed, from the 4th speed to the 3rd speed, or from the 3rd speed to the 2nd speed, in the lower speed ratio range (step 125). when the results of judgment prove that the vehicle is being braked, and the speed ratio is being shifted down in the lower speed ratio range, the program returns to the main flow. When the above condition is not satisfied, the program shifts to the step of judgment for a shiftup, and shift operation similar to that described in the fourth embodiment proceeds. The flow of succeeding steps is the same as that described in the first embodiment, and description thereof is emitted.

Therefore as the vehicle speed decreases, and the speed ratio is successively shifted down from a higher one by braking the vehicle, a lower speed ratio is reached where the vehicle speed is so low that the vehicle is judged to be stopped by braking.

At such a lower speed ratio, an unnecessary shiftdown is not practically done. Thus, a wasteful shift operation is not carried out to ensure satisfactory control feeling. In this embodiment, the step of judgment for a speed shift requirement due to abrupt braking or the step of judgment for clutch engagement or disengagement may be eliminated, so that a shiftdown from a higher speed ratio (for example, the 7th speed) may be inhibited in the case of braking described above. Further, a specific speed ratio inhibiting any shiftdown therefrom should be suitably determined depending on a specific vehicle, a specific automatic transmission system, etc.

The sixth embodiment is advantageous in that elimination of an unnecessary shiftdown in a braked condition of the vehicle ensures satisfactory feeling of control.

A seventh embodiment of the present invention will next be described. This seventh embodiment relates to an engine-stalling preventive device in the aforementioned first to sixth embodiments of the shift control apparatus. The seventh embodiment is featured in that the clutch 31 is disengaged when the engine rotation speed $N_E$ decreases to lower than a predetermined engine-stalling preventive rotation speed so as to prevent stalling of the engine and that the engine-stalling preventive rotation speed developed when the accelerator pedal 37 is not depressed in a general running mode is selected to be higher than the engine-stalling preventive rotation speed developed when the accelerator pedal 37 is depressed in the general running mode and also when the vehicle is in its staring stage.

The part of the seventh embodiment which differs from the preceding embodiments will now be described with reference to FIGS. 1, 3, 5(a), 5(b), 6(a), 8(a), 8(c) and 26, and the remaining structure is the same as that of the preceding embodiment can receive an output signal or an engine rotation increment-decrement signal from the control unit 52 in a relation preferential relative to the signal indicative of the amount of depression of the accelerator pedal 37, and the engine rotation speed $N_E$ is increased or decreased in response to this output signal. When the result of judgment in step 82 in FIG. 8(c) proves that the clutch rotation speed $N_{CL}$ is lower than a predetermined setting, the control unit 52 decides that the vehicle speed has been decreased, and the step 82 is followed by a connector 1 is FIG. 5(a) so as to execute the vehicle starting routine without engaging the clutch 31. Further, when the result of judgment of the position of the change lever 54 in step 69 shown in FIG. 26 proves that the change lever 54 is positioned on the automatic shift range $D_P$ or $D_E$, the following steps are executed in this embodiment. That is, the vehicle speed and the amount of depression of the accelerator pedal 37 are detected (steps 94, 95), and judgment is made in step 69 as to whether the change lever 54 is positioned in the $D_P$ range or $D_E$ range. An optimum speed ratio considered to be the desired speed ratio in the $D_P$ range or $D_E$ range is determined from the pre-set map shown in FIG. 3 (step 99). Then, judgment is made as to whether or not the gear position matches the optimum speed ratio (step 100). When the result of judgment is YES, the program returns to the main flow. On the other hand, when the result of judgment is NO, the program shifts to the step in which judgment is made as to whether or not a shiftup is required, and operation similar to that described already is carried out.

When the result of judgment of the position of the change lever 54 proves that the change lever 54 is on the R range, the CPU 66 judges as to whether or not the gear position matches the R range which is the desired speed ratio (step 105). When the vehicle is now moving backward, and the result of judgment is YES, the program returns to the main flow. On the other hand, when the change lever 54 is mal-operated, and the result of judgment is NO, the engine rotation speed $N_E$ is decreased to the idling rotation speed, and the clutch 31 is disengaged as described already (steps 106, 107). The CPU 66 applies an output signal to the individual magnetic valves 53 through the output ports 74 so as to return the gear position to the neutral. After energization of a reverse warning lamp informing the misshift, the clutch 31 is engaged, and the program returns to the main flow (steps 108, 109, 84, 85).

When the result of judgment of the position of the change lever 54 proves that the change lever 54 is positioned on the N range, judgment is made as to whether or not the change lever 54 has been moved within a predetermined period of time as shown in FIG. 8(c), that is, whether or not the change lever 54 has merely passed through the N range in the course of the shift operation by the driver (step 110). When the change lever 54 has merely passed through the N range in the course of the shift operation, and the result of judgment is YES, the position of the change lever 54 and the gear position are judged as described already (step 70), and the program returns directly to the main flow or returns to the main flow after a shiftup or a shiftdown. However, when the N range is selected, and the result of judgment is NO, the engine rotation speed $N_E$ is decreased to the idling rotation speed (step 111), and the clutch 31 is disengaged (step 112). After shifting the gear position to the neutral (step 113), the clutch 31 is engaged again, and the program returns to the main flow (steps 84, 85).

In the meantime, an engine rotation computing routine as shown in FIG. 5(b) is executed at a suitable position in the flow described above. Referring to FIG. 5(b), whether the engine 30 is in a stopped state or not is first judged from both the engine rotation speed $N_E$ and the oil pump. More precisely, judgment is made as to whether or not the engine rotation speed $N_E$ is lower than a predetermined setting (a value close to zero) (step 5), when the result of judgment proves that the engine rotation speed $N_E$ is lower than the setting, judgment is then made as to whether or not the oil pump is stopped (step 6). When the result of judgment prove that the oil pump is stopped, the engine is regard to be stopped, and the program shifts to the connector 2 shown in FIG. 6(a). On the other hand, when the oil pump is not stopped or when the engine rotation speed $N_E$ exceeds the setting, judgment is then made as to whether or not the vehicle-starting routine is now being executed (step 7). When the result of judgment proves that the vehicle-starting routine is not executed, that is, when the vehicle is in its general running mode, judgment is made as to whether or not the accelerator pedal 37 is depressed (step 8). When the result of judgment proves that the accelerator pedal 37 is depressed, that is, when the amount of depression of the accelerator pedal 37 exceeds a predetermined setting, the engine rotation speed $N_E$ is compared in step 9 with a pre-set first engine-stalling preventive rotation speed $N_{EST1}$. When the engine rotation speed $N_E$ is lower than the first engine-stalling preventive rotation speed $N_{EST1}$, the clutch 31 is disengaged (step 10), and the program shifts to the connector 1 shown in FIG. 5(a). When the engine rotation speed $N_E$ exceeds the first engine-stalling preventive program speed $N_{EST1}$, the engine rotation computing routine is ended. On the other hand, when the result of judgment proves that the accelerator pedal 37 is not depressed, that is, when the amount of depression of the accelerator pedal 37 is less than the setting, the engine rotation speed $N_E$ is compared with a second engine-stalling preventive rotation speed $N_{EST2}$ set at a level higher than the first engine-stalling preventive rotation speed $N_{EST1}$ (step 11). When the engine rotation speed $N_E$ is lower than the second engine-stalling preventive rotation speed $N_{EST2}$, the clutch 31 is similarly disengaged, while, when the engine rotation speed $N_E$ exceeds the second engine-stalling preventive rotation speed $N_{EST2}$, the engine rotation computing routine is ended. Further, when the vehicle starting routine is now being executed, the program proceeds to step 9 without regard to the amount of depression of the accelerator pedal 37, and the engine rotation speed $N_E$ is compared with the first engine-stalling preventive rotation speed $N_{EST1}$. Then, operation similar to that described above is carried out.

Thus, the clutch 31 is disengaged so as to prevent stalling of the engine when the engine rotation speed $N_E$ is lower than a predetermined engine-stalling preventive rotation speed (step 10). The engine-stalling preventive rotation speed, when the accelerator pedal 37 is not depressed in the general running mode, is selected to be higher than the engine-stalling preventive rotation speed developed when the accelerator pedal 37 is depressed in the general running mode and, also, when the vehicle is in its starting stage. In the present embodiment, the first engine-stalling preventive rotation speed $N_{EST1}$ is set at 300 rpm where there is possibility of engine stalling, and the second engine-stalling preventive rotation speed $N_{EST2}$ is set at 600 rpm which is close to the idling rotation speed of the engine 30. Therefore, the pre-set engine-stalling preventive rotation speed is as shown in Table 1 and differs depending on whether or not the accelerator pedal 37 is depressed in the general running mode or the vehicle is in its starting stage.

TABLE 1

| | Engine-stalling preventive rotation speed | |
|---|---|---|
| | Accelerator ON | Accelerator OFF |
| Starting | 300 rpm | 300 rpm |
| General Running | 300 rpm | 600 rpm |

By so setting the engine-stalling preventive rotation speed, the clutch 31 is disengaged at a relatively high engine rotation speed $N_E$ when the accelerator pedal 37 is not depressed in the general running mode, so that shock attributable to disengagement of the clutch 31 can be prevented. Also, even when the engine rotation speed $N_E$ decreases due to, for example, an increase in the load although the accelerator pedal 37 is depressed, the clutch 31 is kept engaged even at a low rotation speed, so that tenacious drive can be achieved. On the other hand, in the vehicle starting stage, the clutch 31 is always engaged even at a low engine rotation speed $N_E$ regardless of depression of the accelerator pedal 37, so that the vehicle can be smoothly started regardless of on-off of the accelerator pedal 37 by the driver in the vehicle starting stage.

As described above, according to the seventh embodiment, the clutch 31 is automatically disengaged when the engine rotation speed $N_E$ becomes lower than a predetermined engine-stalling preventive rotation speed. Therefore, the seventh embodiment is advantageous in that accidental engine stalling can be prevented, shock attributable to disengagement of the clutch 31 can be prevented, the vehicle can be smoothly started, tenacious drive can be achieved, etc.

Figure 27:
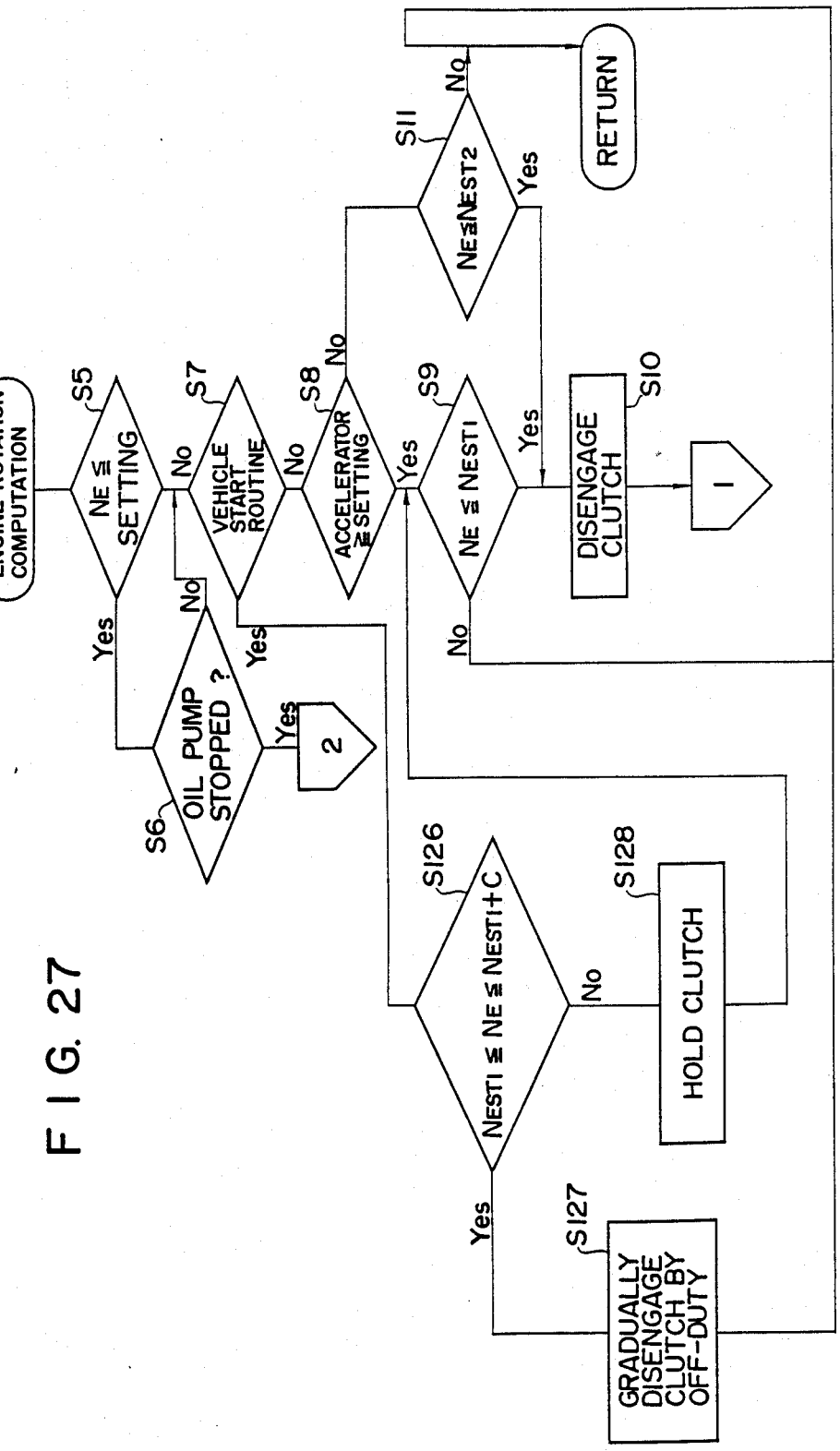
FIG. 27 is a flow chart showing an example of a control program in an eighth embodiment of the present invention.

An eighth embodiment of the prevent invention will next be described. This eighth embodiment relates to an engine stalling preventive device in the shift control apparatus, as in the case of the seventh embodiment. In this eighth embodiment, the clutch 31 is disengaged as soon as the engine rotation speed $N_E$ becomes lower than an engine-stalling preventive rotation speed, so as to prevent stalling of the engine. The eighth embodiment is also featured in that, when the engine rotation speed $N_E$ is in a range slightly higher than the engine-stalling preventive rotation speed, the clutch 31 is gradually disengaged so as to prevent shock which is imparted when the clutch 31 is disengaged for preventing stalling of the engine. In the engine rotation computing routine of the seventh embodiment shown in FIG. 5(b), when the result of judgment made in step 7 proves that the vehicle starting routine is being run, the step 7 is followed by step 9 where the engine rotation speed $N_E$ is compared with the first engine-stalling preventive program speed $N_{EST1}$. The eighth embodiment differs only from the seventh embodiment in that steps 126 to 128 as shown in FIG. 27 executed, and the remaining steps of processing are the same as those of the seventh embodiment. The eighth embodiment will be described with regard to the above difference only. In step 7 in FIG. 27, judgment is made as to whether or not the engine rotation speed $N_E$ lies within the range of from the aforementioned first engine-stalling preventive rotation speed $N_{EST1}$ to a slightly higher rotation speed ($N_{EST1}+C$) when the vehicle starting routine is being run (step 126). When the result of judgment proves that the engine rotation preventive rotation speed $N_E$. The eighth embodiment differs only from the seventh embodiment in that steps 126 to 128 as shown in FIG. 27 are executed, and the remaining steps of processing are the same as those of the seventh embodiment. The eighth embodiment will be described with regard to the above difference only. In step 7 in FIG. 27, judgment is made as to whether or not the engine rotation speed $N_E$ lies within the range of from the aforementioned first engine-stalling preventive rotation speed $N_{EST1}$ to a slightly higher rotation speed ($N_{EST1}+C$) when the vehicle starting routine is being run (step 126). When the result of judgment proves that the engine rotation speed $N_E$ lies within the above range, the clutch 31 is gradually disengaged by application of an off-duty signal in step 127. On the other hand, when the result of judgment is NO, the clutch 31 is kept engaged in step 128, and the engine rotation speed $N_E$ is compared with the first engine-stalling preventive rotation speed $N_{EST1}$ as described already (step 9). When the engine rotation speed $N_E$ is lower than the first engine-stalling preventive rotation speed $N_{EST1}$, the clutch 31 is disengaged (step 10). On the other hand, when the engine rotation speed $N_E$ is equal to or exceeds the first engine-stalling preventive rotation speed $N_{EST1}$, the engine rotation computing routine is ended.

Unless the clutch 31 is immediately disengaged (step 10), when the engine rotation speed $N_E$ decreases to lower than the first engine-stalling preventive rotation speed $N_{EST1}$ in step 9, stalling of the engine may result from a delayed control or the like. However, abrupt disengagement in such a state will impart shock. The eighth embodiment includes a further step 127 in which, when the result of judgment in step 126 proves that the engine rotation speed $N_E$ lies within the range of from the first engine-stalling preventive rotation $N_{EST1}$ (300 rpm) to $N_{EST1}+C$ (500 rpm) the clutch 31 is gradually disengaged, so as to prevent the shock occurring due to abrupt disengagement of the clutch 31. In the general running mode too, the clutch 31 may also be gradually disengaged, when the lower first engine-stalling rotation speed $N_{EST1}$ is set, and the engine rotation speed $N_E$ becomes slightly higher than that.

According to the eighth embodiment, the clutch is automatically disengaged when the engine rotation speed becomes lower than a predetermined engine-stalling preventive rotation speed. Therefore, the eighth embodiment is advantageous in that accidental stalling of the engine can be prevented, and the shock appearing due to disengagement of the clutch can also be prevented.

In the aforementioned first to eighth embodiments, air pressure from the vehicle's air tank 42 is utilized to drive the air cylinder 42 actuating the clutch 31. However, it is apparent that oil pressure may also be used as the control medium. In such a case, a source of oil pressure including an oil pump must be newly additionally provided, resulting in an increased cost. It is also apparent that the sequence of shift control, the shift pattern, etc. employed in the embodiments may be suitably modified in minor details as required. The present invention is also applicable to a vehicle equipped with a gasoline engine. Further, a dummy clutch pedal may be provided for the convenience of a driver who is accustomed with manipulation of a manual transmission. In such a case, arrangement may be such that, in the R range and specified speed ranges 1, 2 and 3, the clutch pedal functions in preference to the operation of the air cylinder 42.

We claim:

1. A shift control apparatus for an automatic transmission system comprising:

a clutch coupled to an output shaft of an engine;

a parallel-shaft type gear transmission coupled at its input shaft to said clutch;

a clutch actuator actuating engagement and disengagement of said clutch;

actuator control means for controlling the operation of said actuator;

clutch position detecting means for detecting engagement and disengagement of said clutch;

shift position detecting means for generating a signal indicative of the shift position of said parallel-shaft type gear transmission;

shift position change-over means for changing the meshing state of said parallel-shaft type gear transmission;

memory means for storing a plurality of maps representing optimum speed ratios determined on the basis of signals indicative of at least the speed of the vehicle and the position of an accelerator pedal, said maps including at least a map I and a map II in which a vehicle speed to be changed over to a higher speed ratio is set at a higher vehicle speed than said map I;

operating condition detecting means for detecting the operating condition of the vehicle; and automatic shift control means including map selecting means for selecting one of said maps according to information supplied from said operating condition detecting means, said map selecting means selecting said map I when said operating condition detecting means detects that a brake device is in its non-operating state, but selecting said map II when said operating condition detecting means detects that said brake device is in its operating state, optimum speed ratio determining means for determining an optimum speed ratio on the basis of the map selected by said map selecting means and according to the signals indicative of at least the vehicle speed and accelerator position applied from said operating condition detecting means, coincidence judging for judging as to whether or not the shift position detected by said shift position detecting means coincides with the optimum speed ratio determined by said optimum speed ratio determining means, and shift position selecting means for applying a shift signal to said shift position change-over means so as to shift said parallel-shaft type gear transmission to the optimum shift position when non-coincidence is judged by said coincidence judging means.

2. A shift control apparatus for an automatic transmission system as claimed in claim 1, wherein, when said brake device only is in operation, the vehicle speed to be changed over to a lower speed ratio by said shift position change-over means in shifted to a lower vehicle speed side in said map II than said map I.

3. A shift control apparatus for an automatic transmission system as claimed in claim 1, wherein said map selecting means selects a map I in a general running mode when an exhaust brake device is in a non-operating state, but selects a map II in which a vehicle speed to be changed over to a higher speed ratio is set at a higher vehicle speed than said map I, when said exhaust brake device is in an operating state and said running condition detecting means detects that a brake pedal and the accelerator pedal are not depressed, but said map selecting means selects a map III in which a vehicle speed to be changed over to a higher speed ratio by said shift position change-over means is set at a higher vehicle speed than said map II when said exhaust brake device is in an operating state and said operating condition detecting means detects that the accelerator pedal is not depressed although the brake pedal is depressed, wherein said map selecting means selects said map I in a general running mode when an exhaust brake device is in a non-operating state but selects said map when said exhaust brake device is in an operating state.

4. A shift control device for an automatic transmission system as claimed in claim 3, wherein, when said exhaust brake device only is in operation a vehicle speed to be changed over to a higher speed ratio by said shift position change-over means is shifted to a higher vehicle speed side in said map II than said map I, and a vehicle speed to be changed over to a lower speed ratio is shifted to a lower vehicle speed side in said map II than said map I.

5. A shift control apparatus for an automatic transmission system as claimed in claim 1, wherein there is further provided drive force discriminating means for discriminating, in response to generation of a shift up signal from said optimum speed ratio determining means, the relative magnitude of the present drive force computed from said operating condition detecting means and an effective drive force at the shift-up next speed ratio, and a shift operation for said shift-up is not executed when said drive force discriminating means discriminates that said present drive force is larger than said effective drive force.

6. A shift control apparatus for an automatic transmission system as claimed in claim 5, wherein, in said drive force discriminating means, the magnitude of the present drive force computed on the basis of the stroke position of a control rack of a fuel injection device detected by said operating condition detecting means is compared with that of the effective drive force, and the shift operation for said shift-up is not executed when said drive force discriminating means discriminates that said present drive force is larger than said effective drive force.

7. A shift control apparatus for an automatic transmission system as claimed in claim 5, wherein said drive force discriminating means is constructed to discriminate the magnitude of a drag computed on the basis of the stroke position of a control rack of a fuel injection device and the acceleration of the vehicle detected by said operation condition detecting means relative an effective drive force at the shifted-up next speed ratio, and a shift operation for said shift-up is not executed when said drive force discriminating means discriminates that said drag is larger than said effective drive force.

8. A shift control apparatus for an automatic transmission system as claimed in claim 7, wherein said drag is computed from the drive force and acceleration under the present running condition.

9. A shift control apparatus for an automatic transmission system as claimed in claim 5, wherein said drive force discriminating means is constructed to discriminate the drive force of the vehicle on the basis of the ratio between the present stroke position of a control rack of a fuel injection device before the shift-up and the full stroke position of the control rack and, also, on the basis of the gear ratio at the shifted-up speed ratio relative to the gear ratio at the present speed ratio, and a shift operation for said shift-up is not executed when the ratio between the present stroke position and the full stroke position of said control rack is larger than the ratio between the gear ratio at the shifted-up speed ratio and the gear ratio at the present speed ratio.

10. A shift control apparatus for an automatic transmission system as claimed in claim 1, wherein there is further provided shiftdown discriminating means for discriminating, when said optimum speed ratio determining means generates a shiftdown signal and said operating condition detecting means detects that a brake pedal is depressed, as to whether or not the shiftdown signal indicates a shiftdown to a speed ratio lower than a predetermined speed ratio, and a shift operation for said shiftdown is not executed when said shiftdown discriminating means discriminates that said shiftdown signal indicates a shiftdown to a speed ratio lower than said predetermined speed ratio.

11. A shift control apparatus for an automatic transmission system as claimed in claim 10, wherein said predetermined speed ratio is the 5th speed, and, when said shiftdown signal is discriminated to indicate a shiftdown to a speed ratio lower than said 5th speed, a shift operation for said shiftdown is not executed.

12. A shift control apparatus for an automatic transmission system as claimed in claim 1, wherein there is further provided engine-stalling preventive rotation speed discriminating means for discriminating the relative magnitude of the engine rotation speed detected by said operating condition detecting means and an engine-stalling preventive rotation speed preventing engine stalling, and said clutch is disengaged by said actuator control means when said engine-stalling preventive rotation speed discriminating means discriminates that said engine rotation speed is lower than said engine-stalling preventive rotation speed.

13. A shift control apparatus for an automatic transmission system as claimed in claim 12, wherein said engine-stalling preventive rotation speed discriminating means includes first engine-stalling preventive rotation speed discriminating means for discriminating a first engine-stalling preventive rotation speed when said accelerator pedal is depressed in a general running mode and when the vehicle is in its starting stage, and second engine-stalling preventive rotation speed discriminating means for discriminating a second engine-stalling preventive rotation speed when said accelerator pedal is not depressed in the general running mode, and said clutch is disengaged by said actuator control means when said first engine-stalling preventive rotation speed discriminating means or said second engine-stalling preventive rotation speed discriminating means discriminates that the engine rotation speed detected by said operating condition detecting means is lower than said first engine-stalling preventive rotation speed or said second engine-stalling preventive rotation speed.

14. A shift control apparatus for an automatic transmission system as claimed in claim 13, wherein there is further provided engine rotation speed discriminating means for discriminating, when said operating condition detecting means detects starting of the vehicle, as to whether or not the engine rotation speed lies within a range of from said first engine-stalling rotation speed to an engine rotation speed slightly higher than said first engine-stalling preventive rotation speed, said clutch being kept engaged when said engine rotation speed discriminating means discriminates that said engine rotation speed is outside of said range, and said first engine-stalling preventive rotation speed discriminating means discriminates said engine-stalling preventive rotation speed.

15. A shift control apparatus for an automatic transmission system comprising:
 a clutch coupled to an output shaft of an engine;
 a parallel-shaft type gear transmission coupled at its input shaft to said clutch;
 a clutch actuator actuating engagement and disengagement of said clutch;
 actuator control means for controlling the operation of said actuator;
 clutch position detecting means for detecting engagement and disengagement of said clutch;
 shift position detecting means for generating a signal indicative of the shift position of said parallel-shaft type gear transmission;
 shift position change-over means for changing the meshing state of said parallel-shaft type gear transmission;
 operating condition detecting means for detecting the operating condition of at least one of the vehicle, said engine and said parallel-shaft type gear transmission;
 a change lever for selecting either an automatic shift mode in which said parallel-shaft type gear transmission is automatically shifted or a specified shift mode in which said parallel-shaft type gear transmission is shifted to a specified shift position;
 shift position selecting means applying a shift signal to said shift position change-over means for shifting said parallel-shaft type gear to a desired shift position; and
 memory means for storing a plurality of maps representing optimum speed ratios determined on the basis of signals indicative of at least the speed of the vehicle and the position of an accelerator pedal,
 automatic shift control means including map selecting means selecting one of said maps in response to the selection of said change lever and according to information supplied from said operating condition detecting means as to whether an exhaust brake device is in its operating state of not, optimum speed ratio determining means for determining an optimum speed ratio on the basis of the map selected by said map selecting means and according to the signals indicative of at least the vehicle speed and accelerator position applied from said operating condition detecting means as to whether an exhaust brake device is in its operating state of not, optimum speed ratio determining means for determining an optimum speed ratio on the basis of the map selected by said map selecting means and according to the signals indicative of at least the vehicle speed and accelerator position applied from said operating condition detecting means, coincidence judging means for judging as to whether or not the shift position detected by said shift position detecting means coincides with the optimum speed ratio determined by said optimum speed ratio determining means, and shift position selecting means for applying a shift signal to said shift position change-over means so as to shift said parallel-shaft type gear transmission to the optimum shift position when non-coincidence is judged by said coincidence judging means.

16. A shift control apparatus for an automatic transmission system as claimed in claim 15, wherein said map selecting means selects a map I in a general running mode when the exhaust brake device is in its non-operating state, but selects a map II when said brake device is in an operating state and said operating condition detecting means detects that the accelerator pedal is not depressed.

* * * * *